US011894168B2

(12) United States Patent
Kudo et al.

(10) Patent No.: US 11,894,168 B2
(45) **Date of Patent: *Feb. 6, 2024**

(54) SOFT MAGNETIC POWDER, POWDER MAGNETIC CORE, MAGNETIC ELEMENT, AND ELECTRONIC DEVICE

(71) Applicant: Seiko Epson Corporation, Tokyo (JP)

(72) Inventors: Yasuko Kudo, Hachinohe (JP); Mayu Watanabe, Hachinohe (JP); Hiroyoshi Otaka, Hachinohe (JP)

(73) Assignee: SEIKO EPSON CORPORATION

(*) Notice: Subject to any disclaimer, the term of this patent is extended or adjusted under 35 U.S.C. 154(b) by 0 days.

This patent is subject to a terminal disclaimer.

(21) Appl. No.: 17/465,000

(22) Filed: Sep. 2, 2021

(65) Prior Publication Data

US 2021/0398720 A1 Dec. 23, 2021

Related U.S. Application Data

(63) Continuation of application No. 15/716,878, filed on Sep. 27, 2017, now abandoned.

(30) Foreign Application Priority Data

Sep. 29, 2016 (JP) ................................ 2016-191538

(51) Int. Cl.
*H01F 1/153* (2006.01)
*H01F 27/255* (2006.01)
(Continued)

(52) U.S. Cl.
CPC .......... *H01F 1/15308* (2013.01); *B22F 1/054* (2022.01); *C22C 38/002* (2013.01);
(Continued)

(58) Field of Classification Search
CPC ............ C22C 2200/02; C22C 2202/02; C22C 33/003; C22C 33/02; C22C 38/002;
(Continued)

(56) References Cited

U.S. PATENT DOCUMENTS

| | | | |
|---|---|---|---|
| 6,425,960 | B1 | 7/2002 | Yoshizawa et al. |
| 2010/0098576 | A1 | 4/2010 | Yoshizawa et al. |

(Continued)

FOREIGN PATENT DOCUMENTS

| | | | |
|---|---|---|---|
| CN | 103366913 | A | 10/2013 |
| CN | 107887097 | A | 4/2018 |

(Continued)

*Primary Examiner* — Holly Rickman
*Assistant Examiner* — Linda N Chau
(74) *Attorney, Agent, or Firm* — Harness, Dickey & Pierce, P.L.C.

(57) ABSTRACT

A soft magnetic powder has a composition represented by $Fe_{100-a-b-c-d-e-f-g-h}Cu_aSi_bB_cM_dM'_eX_fAl_gTi_h$ (at %) (wherein M is at least one element selected from the group consisting of Nb and the like, M' is at least one element selected from the group consisting of V and the like, X is at least one element selected from the group consisting of C and the like, and a, b, c, d, e, f, g, and h satisfy the following formulae: $0.1 \le a \le 3$, $0<b\le 30$, $0<c\le 25$, $5\le b+c\le 30$, $0.1\le d\le 30$, $0\le e\le 10$, $0\le f\le 10$, $0.002\le g\le 0.032$, and $0\le h\le 0.038$), wherein a crystalline structure having a particle diameter of 1 to 30 nm is contained in an amount of 40 vol % or more.

10 Claims, 5 Drawing Sheets

(51) Int. Cl.

| | |
|---|---|
| ***H01F 27/28*** | (2006.01) |
| ***C22C 38/02*** | (2006.01) |
| ***C22C 38/16*** | (2006.01) |
| ***C22C 38/12*** | (2006.01) |
| ***C22C 38/06*** | (2006.01) |
| ***C22C 38/14*** | (2006.01) |
| ***C22C 38/28*** | (2006.01) |
| ***H01F 3/08*** | (2006.01) |
| ***C22C 38/26*** | (2006.01) |
| ***C22C 38/20*** | (2006.01) |
| ***C22C 38/34*** | (2006.01) |
| ***C22C 38/32*** | (2006.01) |
| ***C22C 38/00*** | (2006.01) |
| ***B22F 1/054*** | (2022.01) |
| *C22C 33/00* | (2006.01) |
| *C22C 33/02* | (2006.01) |
| *H01F 17/04* | (2006.01) |
| *H01F 17/06* | (2006.01) |
| *B22F 9/08* | (2006.01) |
| *B22F 1/142* | (2022.01) |

(52) U.S. Cl.
CPC .............. *C22C 38/02* (2013.01); *C22C 38/06* (2013.01); *C22C 38/12* (2013.01); *C22C 38/14* (2013.01); *C22C 38/16* (2013.01); *C22C 38/20* (2013.01); *C22C 38/26* (2013.01); *C22C 38/28* (2013.01); *C22C 38/32* (2013.01); *C22C 38/34* (2013.01); *H01F 1/15333* (2013.01); *H01F 3/08* (2013.01); *H01F 27/255* (2013.01); *H01F 27/28* (2013.01); *B22F 1/142* (2022.01); *B22F 9/082* (2013.01); *B22F 2999/00* (2013.01); *C22C 33/003* (2013.01); *C22C 33/02* (2013.01); *H01F 17/062* (2013.01); *H01F 2017/048* (2013.01)

(58) Field of Classification Search
CPC ......... C22C 38/02; C22C 38/06; C22C 38/12; C22C 38/14; C22C 38/16; C22C 38/20; C22C 38/26; C22C 38/28; C22C 38/32; C22C 38/34; H01F 1/15308; H01F 1/15333; H01F 17/062; H01F 2017/048; H01F 27/255; H01F 27/28; H01F 3/08
See application file for complete search history.

(56) References Cited

U.S. PATENT DOCUMENTS

| | | | | |
|---|---|---|---|---|
| 2012/0199254 | A1 | 8/2012 | Urata et al. | |
| 2013/0076477 | A1* | 3/2013 | Kino | C22C 38/34 420/104 |
| 2013/0255836 | A1 | 10/2013 | Otsuka et al. | |
| 2016/0177429 | A1 | 6/2016 | Urata et al. | |
| 2018/0073117 | A1 | 3/2018 | Urata et al. | |
| 2018/0090252 | A1 | 3/2018 | Kudo | |

FOREIGN PATENT DOCUMENTS

| | | | |
|---|---|---|---|
| DE | 4230986 | A1 | 3/1993 |
| EP | 0302355 | A1 | 2/1989 |
| EP | 2128292 | A1 | 12/2009 |
| JP | S63-304603 | A | 12/1988 |
| JP | 07-018388 | A | 1/1995 |
| JP | 2003-059710 | A | 2/2003 |
| JP | 3389972 | B2 | 3/2003 |
| JP | 2004-349585 | A | 12/2004 |
| JP | 2012-012699 | A | 1/2012 |
| JP | 2012-082476 | A | 4/2012 |

* cited by examiner

SOFT MAGNETIC POWDER, POWDER MAGNETIC CORE, MAGNETIC ELEMENT, AND ELECTRONIC DEVICE

CROSS-REFERENCE TO RELATED APPLICATIONS

This application is a continuation of U.S. patent application Ser. No. 15/716,878, filed Sep. 27, 2017, which is based on, and claims priority from JP Application Serial Number 2016-191538, filed Sep. 29, 2016, both of which are hereby incorporated by reference herein in their entireties.

BACKGROUND

1. Technical Field

The present invention relates to a soft magnetic powder, a powder magnetic core, a magnetic element, and an electronic device.

2. Related Art

Recently, reduction in size and weight of mobile devices such as notebook personal computers has advanced. However, in order to achieve both reduction in size and enhancement of performance, it is necessary to increase the frequency of a switching power supply. At present, the driving frequency of a switching power supply has been increased to several hundred kilo hertz or more. However, accompanying this, a magnetic element such as a choke coil or an inductor which is built into a mobile device needs to be adapted to deal with the increase in the frequency.

For example, JP-A-2004-349585 discloses a powder magnetic core, which is a powder magnetic core containing a magnetic powder having a composition represented by $Fe_{(100-x-Y-Z-\alpha-\beta)}B_XSi_YCu_ZM_\alpha M'_\beta$ (at %) (wherein M is at least one element selected from the group consisting of Nb, W, Ta, Zr, Hf, Ti, and Mo, M' is at least one element selected from the group consisting of V, Cr, Mn, Al, a platinum group element, Sc, Y, Au, Zn, Sn, Re, and Ag, and X, Y, Z, α, and β satisfy the following formulae: $12 \leq X \leq 15$, $0 < Y \leq 15$, $0.1 \leq Z \leq 3$, $0.1 \leq \alpha \leq 30$, and $0 \leq \beta \leq 10$, respectively), wherein the magnetic powder is either a nanocrystalline magnetic powder in which at least 50% or more of the structure is a nanocrystalline structure having a crystalline particle diameter of 100 nm or less or an amorphous magnetic powder having a composition capable of exhibiting the nanocrystalline structure by a heat treatment.

A magnetic powder having such a nanocrystalline structure can be adapted to deal with the increase in frequency due to excellent soft magnetic properties.

However, in the powder magnetic core described in JP-A-2004-349585, the magnetic permeability of the magnetic powder is insufficient. Therefore, a reduction in the size of the powder magnetic core cannot be sufficiently achieved.

SUMMARY

An advantage of some aspects of the invention is to provide a soft magnetic powder which has a high magnetic permeability, a powder magnetic core and a magnetic element, each of which has a reduced size, and an electronic device which includes this magnetic element and is easy to reduce its size.

The advantage can be achieved by at least the following configurations.

A soft magnetic powder according to an aspect of the invention has a composition represented by $Fe_{100-a-b-c-d-e-f-g-h}Cu_aSi_bB_cM_dM'_eX_fAl_gTi_h$ (at %) (wherein M is at least one element selected from the group consisting of Nb, W, Ta, Zr, Hf, and Mo, M' is at least one element selected from the group consisting of V, Cr, Mn, a platinum group element, Sc, Y, Au, Zn, Sn, and Re, X is at least one element selected from the group consisting of C, P, Ge, Ga, Sb, In, Be, and As, and a, b, c, d, e, f, g, and h are numbers that satisfy the following formulae: $0.1 \leq a \leq 3$, $0 < b \leq 30$, $0 < c \leq 25$, $5 \leq b+c \leq 30$, $0.1 \leq d \leq 30$, $0 \leq e \leq 10$, $0 \leq f \leq 10$, $0.002 \leq g \leq 0.032$, and $0 \leq h \leq 0.038$), wherein a crystalline structure having a particle diameter of 1 nm or more and 30 nm or less is contained in an amount of 40 vol % or more.

According to this configuration, a soft magnetic powder which has a high magnetic permeability is obtained, and therefore, by using such a soft magnetic powder, for example, a powder magnetic core or the like which has a reduced size can be produced.

In the soft magnetic powder according to the aspect of the invention, it is preferred that the volume resistivity of a green compact in a compacted state is 1 kΩ·cm or more and 500 kΩ·cm or less.

According to this configuration, soft magnetic powder particles are sufficiently insulated from each other, and therefore, the amount of use of an insulating material can be reduced, and thus, the proportion of the soft magnetic powder in a powder magnetic core or the like can be increased to the maximum by that amount. As a result, a powder magnetic core which highly achieves both high magnetic properties and low loss can be realized.

In the soft magnetic powder according to the aspect of the invention, it is preferred that the powder further contains an amorphous structure.

According to this configuration, the crystalline structure and the amorphous structure cancel out magnetostriction, and therefore, the magnetostriction of the soft magnetic powder can be further decreased. As a result, a soft magnetic powder capable of easily controlling magnetization is obtained. Further, since dislocation movement hardly occurs in the amorphous structure, the amorphous structure has high toughness. Therefore, the amorphous structure contributes to a further increase in the toughness of the soft magnetic powder, and thus, for example, a soft magnetic powder which hardly causes destruction when the powder is compacted is obtained.

A powder magnetic core according to an aspect of the invention includes the soft magnetic powder according to the aspect of the invention.

According to this configuration, a powder magnetic core which has a reduced size is obtained.

A magnetic element according to an aspect of the invention includes the powder magnetic core according to the aspect of the invention.

According to this configuration, a magnetic element which has a reduced size is obtained.

An electronic device according to an aspect of the invention includes the magnetic element according to the aspect of the invention.

According to this configuration, an electronic device which is easy to reduce its size is obtained.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
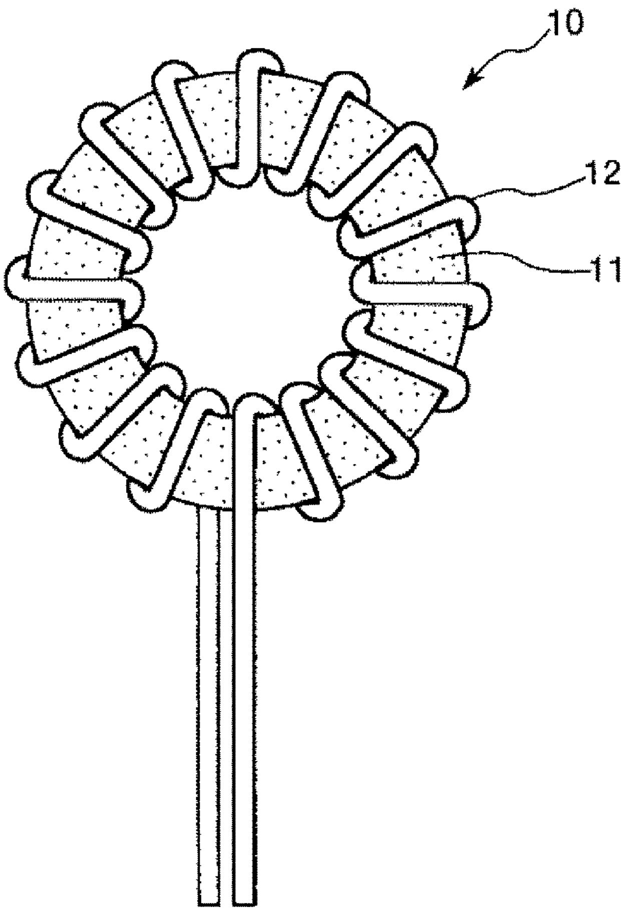
FIG. 1 is a schematic view (plan view) showing a choke coil, to which a first embodiment of a magnetic element according to the invention is applied.

Hereinafter, a soft magnetic powder, a powder magnetic core, a magnetic element, and an electronic device according to the invention will be described in detail based on preferred embodiments shown in the accompanying drawings.

Soft Magnetic Powder

The soft magnetic powder according to the invention is a metal powder having soft magnetism. Such a soft magnetic powder can be applied to any purpose for which soft magnetism is desired to be utilized, and is used for, for example, producing a powder magnetic core by binding the powder particles to one another through a binding material and also by molding the powder into a given shape. In the thus obtained powder magnetic core, the magnetic permeability of the soft magnetic powder is high, and therefore, reduction in size is easily achieved.

The soft magnetic powder according to the invention is a powder having a composition represented by $Fe_{100-a-b-c-d-e-f-g-h}Cu_aSi_bB_cM_dM'_eX_fAl_gTi_h$ (at %). Here, M is at least one element selected from the group consisting of Nb, W, Ta, Zr, Hf, and Mo, M' is at least one element selected from the group consisting of V, Cr, Mn, a platinum group element, Sc, Y, Au, Zn, Sn, and Re, X is at least one element selected from the group consisting of C, P, Ge, Ga, Sb, In, Be, and As, and a, b, c, d, e, f, g, and h are numbers that satisfy the following formulae: $0.1 \leq a \leq 3$, $0<b \leq 30$, $0<c \leq 25$, $5 \leq b+c \leq 30$, $0.1 \leq d \leq 30$, $0 \leq e \leq 10$, $0 \leq f \leq 10$, $0.002 \leq g \leq 0.032$, and $0 \leq h \leq 0.038$.

Further, in the soft magnetic powder according to the invention, a crystalline structure having a particle diameter of 1 nm or more and 30 nm or less is contained in an amount of 40 vol % or more.

Such a soft magnetic powder has a high magnetic permeability, and therefore, a powder magnetic core having a reduced size can be produced.

Hereinafter, the composition of the soft magnetic powder according to an embodiment of the invention will be described in detail.

Fe has a large effect on the basic magnetic properties and mechanical properties of the soft magnetic powder according to the invention.

Cu tends to be separated from Fe when producing the soft magnetic powder according to the invention from a raw material, and therefore causes a fluctuation in the composition, and thus, a region which is easily crystallized is partially formed. As a result, an Fe phase with a body-centered cubic lattice which is relatively easily crystallized is promoted, and thus, Cu can facilitate the formation of the crystalline structure having a small particle diameter as described above.

The content (a) of Cu is set to 0.1 at % or more and 3 at % or less, but is preferably set to 0.3 at % or more and 2 at % or less. When the content (a) of Cu is less than the above lower limit, the crystalline structure fails to be micronized, and therefore, there is a fear that the crystalline structure having a particle diameter within the above range cannot be formed. On the other hand, when the content (a) of Cu exceeds the above upper limit, there is a fear that the mechanical properties of the soft magnetic powder may be deteriorated, resulting in embrittlement.

Si promotes amorphization when producing the soft magnetic powder according to the invention from a raw material. Therefore, when producing the soft magnetic powder according to the invention, first, a homogeneous amorphous structure is formed, and thereafter, the amorphous structure is crystallized, whereby a crystalline structure having a more uniform particle diameter is easily formed. Then, the uniform particle diameter contributes to the averaging out of magnetocrystalline anisotropy in each crystalline particle, and therefore, the coercive force can be decreased and the soft magnetism can be improved.

The content (b) of Si is set to more than 0 at % and 30 at % or less, but is preferably set to 5 at % or more and 20 at % or less. When the content (b) of Si is less than the above lower limit, amorphization is insufficient, and therefore, there is a fear that it becomes difficult to form a crystalline structure having a small and uniform particle diameter. On the other hand, when the content (b) of Si exceeds the above upper limit, there is a fear that the deterioration of the magnetic properties such as saturation magnetic flux density and maximum magnetic moment or the deterioration of the mechanical properties may be caused.

B promotes amorphization when producing the soft magnetic powder according to the invention from a raw material. Therefore, when producing the soft magnetic powder according to the invention, first, a homogeneous amorphous structure is formed, and thereafter, the amorphous structure is crystallized, whereby a crystalline structure having a more uniform particle diameter is easily formed. Then, the uniform particle diameter contributes to the averaging out of magnetocrystalline anisotropy in each crystalline particle, and therefore, the coercive force can be decreased and the soft magnetism can be improved. Further, by using Si and B in combination, based on the difference in atomic radius between Si and B, it is possible to synergistically promote amorphization.

The content (c) of B is set to more than 0 at % and 25 at % or less, but is preferably set to 3 at % or more and 20 at % or less. When the content (c) of B is less than the above lower limit, amorphization is insufficient, and therefore, there is a fear that it becomes difficult to form a crystalline structure having a small and uniform particle diameter. On the other hand, when the content (c) of B exceeds the above upper limit, there is a fear that the deterioration of the magnetic properties such as saturation magnetic flux density and maximum magnetic moment or the deterioration of the mechanical properties may be caused.

Further, the total content of Si and B is defined and set to 5 at % or more and 30 at % or less, but is preferably set to 10 at % or more and 25 at % or less.

M is at least one element selected from the group consisting of Nb, W, Ta, Zr, Hf, and Mo. When a powder containing an amorphous structure in a large amount is subjected to a heat treatment, M contributes to the micronization of the crystalline structure along with Cu. Therefore, M can facilitate the formation of the crystalline structure having a small particle diameter as described above.

The content (d) of M is set to 0.1 at % or more and 30 at % or less, but is preferably set to 0.5 at % or more and 20 at % or less. Further, in the case where the powder contains a plurality of elements as M, the total content of the plurality of elements is set within the above range. When the content (d) of M is less than the above lower limit, the crystalline structure fails to be micronized, and therefore, there is a fear that the crystalline structure having a particle diameter within the above range cannot be formed. On the other hand, when the content (d) of M exceeds the above upper limit, there is a fear that the mechanical properties of the soft magnetic powder may be deteriorated, resulting in embrittlement.

Further, it is particularly preferred that M includes Nb. Nb particularly largely contributes to the micronization of the crystalline structure.

Al promotes the formation of the crystalline structure having a uniform particle diameter in each soft magnetic powder particle by adding Al in a small amount. The content (g) of Al is set to 0.002 at % or more and 0.032 at % or less, but is preferably set to 0.004 at % or more and 0.024 at % or less, more preferably 0.006 at % or more and 0.019 at % or less. If the content (g) of Al exceeds the above upper limit, when the soft magnetic powder according to the invention is produced from a raw material, amorphization is likely to be inhibited. Therefore, when the crystalline structure is finally formed in the soft magnetic powder particle, the particle diameter thereof is likely to be non-uniform, and there is a fear that the magnetic properties such as magnetic permeability may be deteriorated. On the other hand, when the content (g) of A1 is less than the above lower limit, although amorphization is promoted, it becomes difficult to make the crystallization proceed uniformly in the crystallization treatment. Due to this, the particle diameter of the crystalline structure to be formed is likely to be non-uniform, and therefore, there is a fear that the magnetic properties such as magnetic permeability may be deteriorated.

The soft magnetic powder according to the invention may contain at least one element of M' and X, each of which is an arbitrary element, and Ti as desired other than the other elements described above.

M' is at least one element selected from the group consisting of V, Cr, Mn, a platinum group element, Sc, Y, Au, Zn, Sn, and Re. Such M' enhances the magnetic properties of the soft magnetic powder, and also enhances corrosion resistance. The platinum group element refers to six elements in periods 5 and 6 and in groups 8, 9, and 10 in the periodic table, and is specifically at least one element of Ru, Rh, Pd, Os, Ir, and Pt.

The content (e) of M' is set to 0 at % or more and 10 at % or less, but is preferably set to 0.1 at % or more and 5 at % or less. When the content (e) of M' exceeds the above upper limit, there is a fear that the deterioration of the magnetic properties such as saturation magnetic flux density and maximum magnetic moment or the deterioration of the mechanical properties may be caused.

Further, it is particularly preferred that M' includes Cr. Cr suppresses the oxidation of the soft magnetic powder, and therefore can particularly suppress the deterioration of the magnetic properties or the deterioration of the mechanical properties accompanying oxidation.

X is at least one element selected from the group consisting of C, P, Ge, Ga, Sb, In, Be, and As. Such X promotes amorphization when producing the soft magnetic powder according to the invention from a raw material in the same manner as B. Therefore, X contributes to the formation of the crystalline structure having a more uniform particle diameter in the soft magnetic powder.

The content (f) of X is set to 0 at % or more and 10 at % or less, but is preferably set to 0.1 at % or more and 5 at % or less. When the content (f) of X exceeds the above upper limit, there is a fear that the deterioration of the magnetic properties such as saturation magnetic flux density and maximum magnetic moment or the deterioration of the mechanical properties may be caused.

Ti promotes the formation of the crystalline structure having a uniform particle diameter in each soft magnetic powder particle by adding Ti in a small amount.

The content (h) of Ti is set to preferably 0 at % or more and 0.038 at % or less, more preferably 0.002 at % or more and 0.025 at % or less, further more preferably 0.004 at % or more and 0.020 at % or less. If the content (h) of Ti exceeds the above upper limit, when the soft magnetic powder according to the invention is produced from a raw material, amorphization is likely to be inhibited. Therefore, when the crystalline structure is finally formed in the soft magnetic powder particle, the particle diameter thereof is likely to be non-uniform, and there is a fear that the magnetic properties such as magnetic permeability may be deteriorated. On the other hand, when the content (h) of Ti is less than the above lower limit, although amorphization is promoted, it becomes difficult to make the crystallization proceed uniformly in the crystallization treatment. Due to this, the particle diameter of the crystalline structure to be formed is likely to be non-uniform, and therefore, there is a fear that the magnetic properties such as magnetic permeability may be deteriorated.

Further, in the soft magnetic powder according to the invention, O (oxygen) may be intentionally added, however, O is unintentionally mixed therein as an impurity in many cases. In such a case, the content of O (oxygen) in terms of mass ratio is preferably 50 ppm or more and 700 ppm or less, more preferably 100 ppm or more and 650 ppm or less, further more preferably 200 ppm or more and 600 ppm or less. By controlling the content of 0 within the above range, the coercive force of the soft magnetic powder can be decreased while ensuring the insulating properties between the soft magnetic powder particles. Accordingly, a powder magnetic core or a magnetic element having reduced loss can be achieved.

When the content of O is less than the above lower limit, it becomes difficult to stably produce the soft magnetic powder containing oxygen at such a low concentration, and therefore, there is a fear that problems may occur in the production cost or the production yield. Further, depending on the composition of the material of the soft magnetic powder or the like, the insulating properties between the particles are deteriorated, and therefore, there is a fear that the eddy current loss may be increased. On the other hand, when the content of O exceeds the above upper limit, depending on the composition of the material of the soft magnetic powder or the like, the coercive force is increased, and therefore, there is a fear that the hysteresis loss may be increased.

The content of O is a value measured at a stage before performing a heating treatment such as a crystallization treatment in the below-mentioned method for producing the soft magnetic powder.

Hereinabove, the composition of the soft magnetic powder according to the invention has been described in detail, however, this soft magnetic powder may contain elements (for example, S, N, etc.) other than the above-mentioned elements. In such a case, the total content of such elements other than the above-mentioned elements is preferably less than 0.1 at %. Such elements other than the above-mentioned elements may be contained without regard to whether they are contained inevitably or intentionally as long as the total content thereof is within this range.

The composition of the soft magnetic powder can be determined by, for example, Iron and steel—Atomic absorption spectrometric method defined in JIS G 1257 (2000), Iron and steel—ICP atomic emission spectrometric method defined in JIS G 1258 (2007), Iron and steel—Method for spark discharge atomic emission spectrometric analysis defined in JIS G 1253 (2002), Iron and steel—Method for X-ray fluorescence spectrometric analysis defined in JIS G 1256 (1997), gravimetry, titrimetry, and absorption spectroscopy defined in JIS G 1211 to G 1237, or the like. Specifically, for example, an optical emission spectrometer for solids (a spark emission spectrometer, model: Spectrolab, type: LAVMB08A) manufactured by SPECTRO Analytical Instruments GmbH or an ICP device (model: CIROS-120) manufactured by Rigaku Corporation can be used.

Further, when C (carbon) and S (sulfur) are determined, particularly, an infrared absorption method after combustion in a stream of oxygen (after combustion in a high-frequency induction heating furnace) specified in JIS G 1211 (2011) is also used. Specifically, a carbon-sulfur analyzer, CS-200 manufactured by LECO Corporation can be used.

Further, when N (nitrogen) and O (oxygen) are determined, particularly, Iron and steel—Method for determination of nitrogen content specified in JIS G 1228 (2006) and Method for determination of oxygen content in metallic materials specified in JIS Z 2613 (2006) can also be used. Specifically, an oxygen-nitrogen analyzer, TC-300/EF-300 manufactured by LECO Corporation can be used.

The soft magnetic powder according to the invention contains a crystalline structure having a particle diameter of 1 nm or more and 30 nm or less in an amount of 40 vol % or more. The crystalline structure having such a particle diameter is small, and therefore, the magnetocrystalline anisotropy in each crystalline particle is easily averaged out. Therefore, the coercive force can be decreased, and a powder which is especially magnetically soft is obtained. Then, by containing the crystalline structure having such a particle diameter in an amount not lower than the above lower limit, such an effect is obtained sufficiently.

The content ratio of the crystalline structure having a particle diameter within the above range is set to 40 vol % or more, but is set to preferably 50 vol % or more and 99 vol % or less, more preferably 60 vol % or more and 95 vol % or less. When the content ratio of the crystalline structure having a particle diameter within the above range is less than the above lower limit, the ratio of the crystalline structure having a small particle diameter is decreased, and therefore, the averaging out of magnetocrystalline anisotropy by the exchange interaction of crystalline particles is insufficient, and thus, there is a fear that the magnetic permeability of the soft magnetic powder may be decreased or the coercive force of the soft magnetic powder may be increased. On the other hand, the content ratio of the crystalline structure having a particle diameter within the above range may exceed the above upper limit, however, as described later, there is a fear that the effect of coexistence with an amorphous structure may be insufficient.

Further, the soft magnetic powder according to the invention may contain a crystalline structure having a particle diameter outside the above range (less than 1 nm or more than 30 nm). In such a case, the amount of the crystalline structure having a particle diameter outside the above range is suppressed to preferably 10 vol % or less, more preferably 5 vol % or less. According to this, the decrease in the above-mentioned effect due to the crystalline structure having a particle diameter outside the above range can be suppressed.

The particle diameter of the crystalline structure of the soft magnetic powder according to the invention is obtained by, for example, a method in which the cut surface of the particle of the soft magnetic powder is observed by an electron microscope and a measurement is taken from the observation image, or the like. In addition, the content ratio (vol %) is obtained by a method in which an area ratio occupied by crystals having a particle diameter within the above range in the observation image is determined, and the area ratio is defined as the content ratio.

Further, in the soft magnetic powder according to the invention, the average particle diameter of the crystalline structure is preferably 3 nm or more and 30 nm or less, more preferably 5 nm or more and 25 nm or less. According to this, the above-mentioned effect becomes more pronounced, and a powder which is especially magnetically soft is obtained.

The average particle diameter of the crystalline structure of the soft magnetic powder according to the invention can be obtained by, for example, calculation from the width of a diffraction peak in a spectrum obtained by X-ray diffractometry.

On the other hand, the soft magnetic powder according to the invention may contain an amorphous structure. By the coexistence of the crystalline structure having a particle diameter within the above range and the amorphous structure, the magnetostriction is cancelled out by each other, and therefore, the magnetostriction of the soft magnetic powder can be further decreased. As a result, a soft magnetic powder capable of easily controlling magnetization is obtained. Further, since dislocation movement hardly occurs in the amorphous structure, the amorphous structure has high toughness. Therefore, the amorphous structure contributes to a further increase in the toughness of the soft magnetic powder, and thus, for example, a soft magnetic powder which hardly causes destruction when the powder is compacted and easily maintains favorable insulating properties also after the powder is compacted is obtained.

In such a case, the content ratio of the amorphous structure is preferably 2 vol % or more and 500 vol % or less, more preferably 10 vol % or more and 200 vol % or less with respect to the content ratio of the crystalline structure having a particle diameter within the above range. According to this, the balance between the crystalline structure and the amorphous structure is optimized, and thus, the effect of the coexistence of the crystalline structure and the amorphous structure is more pronounced.

Incidentally, it can be confirmed whether or not the structure contained in the soft magnetic powder is amorphous by, for example, examining whether or not a diffraction peak is observed in a spectrum obtained by X-ray diffractometry.

Further, the soft magnetic powder according to the invention is configured such that the Vickers hardness of the particles is preferably 1000 or more and 3000 or less, more preferably 1200 or more and 2500 or less. The soft magnetic powder having such a hardness can suppress the deformation at a contact point between particles to the minimum when the soft magnetic powder is formed into a powder magnetic core by compression-molding. Therefore, a contact area is suppressed to be small, resulting in increasing the resistivity of a green compact of the soft magnetic powder. As a result, high insulating properties between particles can be more highly ensured when the powder is compacted.

If the Vickers hardness is less than the above lower limit, when the soft magnetic powder is compression-molded, the particles are likely to be crushed at a contact point between particles depending on the average particle diameter of the soft magnetic powder. Due to this, the contact area is increased, and the resistivity of a green compact of the soft magnetic powder is decreased, therefore, there is a fear that the insulating properties between particles may be deteriorated. On the other hand, if the Vickers hardness exceeds the above upper limit, the powder compactibility is decreased depending on the average particle diameter of the soft magnetic powder, resulting in decreasing the density when the soft magnetic powder is formed into a powder magnetic core, and therefore, there is a fear that the magnetic properties of the powder magnetic core may be deteriorated.

The Vickers hardness of the particles of the soft magnetic powder is measured by a Micro Vickers hardness tester in a central portion of the cross section of the particle. The "central portion of the cross section of the particle" refers to a portion corresponding to the midpoint of a major axis, which is the maximum length of the particle, on a cut surface when the particle is cut along the major axis. Further, the load of pushing an indenter when performing the test is set to 50 mN.

The average particle diameter D50 of the soft magnetic powder according to the invention is not particularly limited, but is preferably 1 μm or more and 40 μm or less, more preferably 3 μm or more and 30 μm or less. By using the soft magnetic powder having such an average particle diameter, a path through which an eddy current flows can be shortened, and therefore, a powder magnetic core capable of sufficiently suppressing eddy current loss generated in the particles of the soft magnetic powder can be produced. Further, since the average particle diameter is moderately small, the filling properties can be enhanced when the powder is compacted. As a result, the filling density of a powder magnetic core can be increased, and thus, the saturation magnetic flux density and the magnetic permeability of the powder magnetic core can be increased.

When the average particle diameter of the soft magnetic powder is less than the above lower limit, the soft magnetic powder is too fine, and therefore, there is a fear that the filling properties of the soft magnetic powder are likely to be deteriorated. Due to this, the molding density of the powder magnetic core (one example of the green compact) is decreased, and thus, there is a fear that the saturation magnetic flux density or the magnetic permeability of the powder magnetic core may be decreased depending on the composition of the material of the soft magnetic powder or the mechanical properties thereof. On the other hand, when the average particle diameter of the soft magnetic powder exceeds the above upper limit, the eddy current loss generated in the particles cannot be sufficiently suppressed depending on the composition of the material of the soft magnetic powder or the mechanical properties thereof, and therefore, there is a fear that the iron loss of the powder magnetic core may be increased. Incidentally, the average particle diameter of the soft magnetic powder is obtained as a particle diameter when the cumulative frequency from the small diameter side reaches 50% in a particle size distribution on a mass basis obtained by laser diffractometry.

The coercive force of the soft magnetic powder according to the invention is not particularly limited, but is preferably 0.1 Oe or more and 2 Oe or less (7.98 A/m or more and 160 A/m or less), more preferably 0.5 Oe or more and 1.5 Oe or less (39.9 A/m or more and 120 A/m or less). By using the soft magnetic powder having such a low coercive force, a powder magnetic core capable of sufficiently suppressing the hysteresis loss even at a high frequency can be produced.

Incidentally, the coercive force of the soft magnetic powder can be measured using a magnetometer (for example, "TM-VSM 1230-MHHL", manufactured by Tamakawa Co., Ltd., or the like).

Further, the volume resistivity of the soft magnetic powder according to the invention when it is formed into a green compact (the volume resistivity in a compacted state) is preferably 1 kΩ·cm or more and 500 kΩ·cm or less, more preferably 5 kΩ·cm or more and 300 kΩ·cm or less, further more preferably 10 kΩ·cm or more and 200 kΩ·cm or less. Such a volume resistivity is achieved without using an insulating material, and therefore is based on the insulating properties between the particles of the soft magnetic powder itself. Therefore, by using the soft magnetic powder which achieves such a volume resistivity, particles of the soft magnetic powder are sufficiently insulated from each other, so that the amount of an insulating material used can be reduced, and thus, the proportion of the soft magnetic powder in a powder magnetic core or the like can be increased to the maximum by that amount. As a result, a powder magnetic core which highly achieves both high magnetic properties and low loss can be realized.

The volume resistivity described above is a value measured as follows.

First, 0.8 g of the soft magnetic powder to be measured is filled in an alumina cylinder. Then, brass electrodes are disposed on the upper and lower sides of the cylinder.

Then, an electrical resistance between the upper and lower electrodes is measured using a digital multimeter while applying a pressure of 10 MPa between the upper and lower electrodes using a digital force gauge.

Then, the volume resistivity is calculated by substituting the measured electrical resistance, the distance between the electrodes when applying the pressure, and the internal cross-sectional area of the cylinder for the following calculation formula.

Volume resistivity(kΩ·cm)=Electrical resistance (kΩ)×Internal cross-sectional area of cylinder ($cm^2$)/Distance between electrodes (cm)

The internal cross-sectional area of the cylinder can be obtained according to the formula: $\pi r^2$ ($cm^2$) when the inner diameter of the cylinder is represented by 2r (cm).

Powder Magnetic Core and Magnetic Element

Next, the powder magnetic core and the magnetic element according to the invention will be described.

The magnetic element according to the invention can be applied to a variety of magnetic elements including a magnetic core such as a choke coil, an inductor, a noise filter, a reactor, a transformer, a motor, an actuator, a solenoid valve, and an electrical generator. Further, the powder magnetic core according to the invention can be applied to magnetic cores included in these magnetic elements.

Hereinafter, two types of choke coils will be described as representative examples of the magnetic element.

First Embodiment

First, a choke coil to which a first embodiment of the magnetic element according to the invention is applied will be described.

FIG. 1 is a schematic view (plan view) showing a choke coil to which the first embodiment of the magnetic element according to the invention is applied.

A choke coil 10 (the magnetic element according to this embodiment) shown in FIG. 1 includes a powder magnetic core 11 having a ring shape (toroidal shape) and a conductive wire 12 wound around the powder magnetic core 11. Such a choke coil 10 is generally referred to as "toroidal coil".

The powder magnetic core 11 (the powder magnetic core according to this embodiment) is obtained by mixing the soft magnetic powder according to the invention, a binding material (binder), and an organic solvent, supplying the obtained mixture in a mold, and press-molding the mixture. That is, the powder magnetic core 11 contains the soft magnetic powder according to the invention. Since the magnetic permeability of the soft magnetic powder is high, such a powder magnetic core 11 has a reduced size. As a result, when the powder magnetic core 11 is mounted on an electronic device or the like, the mounting space can be saved, and thus, it can contribute to the reduction in size of the electronic device or the like.

Further, as described above, the choke coil 10 which is one example of the magnetic element includes the powder magnetic core 11. Therefore, the choke coil 10 has a reduced size. As a result, when the choke coil 10 is mounted on an electronic device or the like, the mounting space can be saved, and thus, it can contribute to the reduction in size of the electronic device or the like.

Examples of the constituent material of the binding material to be used for producing the powder magnetic core 11 include organic materials such as a silicone resin, an epoxy resin, a phenolic resin, a polyamide resin, a polyimide resin, and a polyphenylene sulfide resin, and inorganic materials such as phosphates such as magnesium phosphate, calcium phosphate, zinc phosphate, manganese phosphate, and cadmium phosphate, and silicates (liquid glass) such as sodium silicate, and particularly, a thermosetting polyimide resin or a thermosetting epoxy resin is preferred. These resin materials are easily cured by heating and have excellent heat resistance. Therefore, the ease of production of the powder magnetic core 11 and also the heat resistance thereof can be increased.

The ratio of the binding material to the soft magnetic powder slightly varies depending on the desired saturation magnetic flux density and mechanical properties, the allowable eddy current loss, etc. of the powder magnetic core 11 to be produced, but is preferably about 0.5 mass % or more and 5 mass % or less, more preferably about 1 mass % or more and 3 mass % or less. According to this, the powder magnetic core 11 having excellent magnetic properties such as saturation magnetic flux density and magnetic permeability can be obtained while sufficiently binding the particles of the soft magnetic powder.

The organic solvent is not particularly limited as long as it can dissolve the binding material, but examples thereof include various solvents such as toluene, isopropyl alcohol, acetone, methyl ethyl ketone, chloroform, and ethyl acetate.

To the above-mentioned mixture, any of a variety of additives may be added for an arbitrary purpose as needed.

Examples of the constituent material of the conductive wire 12 include materials having high electrical conductivity, for example, metal materials including Cu, Al, Ag, Au, Ni, and the like.

It is preferred that on the surface of the conductive wire 12, a surface layer having insulating properties is provided. According to this, a short circuit between the powder magnetic core 11 and the conductive wire 12 can be reliably prevented. Examples of the constituent material of such a surface layer include various resin materials.

Next, a method for producing the choke coil 10 will be described.

First, the soft magnetic powder according to the invention, a binding material, all sorts of desired additives, and an organic solvent are mixed, whereby a mixture is obtained.

Subsequently, the mixture is dried to obtain a block-shaped dry material. Then, the obtained dry material is pulverized, whereby a granular powder is formed.

Subsequently, this granular powder is molded into a shape of a powder magnetic core to be produced, whereby a molded body is obtained.

A molding method in this case is not particularly limited, however, examples thereof include press-molding, extrusion-molding, and injection-molding. The shape and size of this molded body are determined in anticipation of shrinkage when heating the molded body in the subsequent step. Further, the molding pressure in the case of press-molding is set to about 1 t/cm$^2$ (98 MPa) or more and 10 t/cm$^2$ (981 MPa) or less.

Subsequently, by heating the obtained molded body, the binding material is cured, whereby the powder magnetic core 11 is obtained. The heating temperature at this time slightly varies depending on the composition of the binding material and the like, however, in the case where the binding material is composed of an organic material, the heating temperature is set to preferably about 100° C. or higher and 500° C. or lower, more preferably about 120° C. or higher and 250° C. or lower. The heating time varies depending on the heating temperature, but is set to about 0.5 hours or more and 5 hours or less.

According to the above-mentioned method, the choke coil 10 (the magnetic element according to the invention) including the powder magnetic core 11 obtained by press-molding the soft magnetic powder according to the invention and the conductive wire 12 wound around the powder magnetic core 11 along the outer peripheral surface thereof is obtained.

The shape of the powder magnetic core 11 is not limited to the ring shape shown in FIG. 1, and may be, for example, a split ring or a rod.

Second Embodiment

Next, a choke coil to which a second embodiment of the magnetic element according to the invention is applied will be described.

Figure 2:
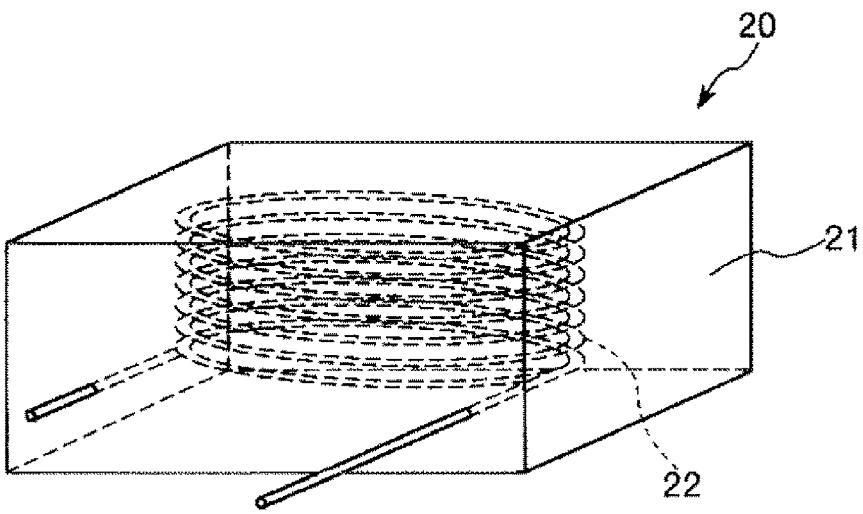
FIG. 2 is a schematic view (transparent perspective view) showing a choke coil, to which a second embodiment of a magnetic element according to the invention is applied.

FIG. 2 is a schematic view (transparent perspective view) showing a choke coil to which a second embodiment of the magnetic element according to the invention is applied.

Hereinafter, the choke coil according to the second embodiment will be described, however, in the following description, different points from the above-mentioned choke coil according to the first embodiment will be mainly described and the description of the same matter will be omitted.

As shown in FIG. 2, a choke coil 20 according to this embodiment includes a conductive wire 22 molded into a coil shape and embedded inside a powder magnetic core 21. That is, the choke coil 20 is obtained by molding the conductive wire 22 with the powder magnetic core 21.

As the choke coil 20 having such a configuration, a relatively small choke coil is easily obtained. In the case where such a small choke coil 20 is produced, by using the powder magnetic core 21 having a high saturation magnetic flux density and a high magnetic permeability, and also having low loss, the choke coil 20 which has low loss and generates low heat so as to be able to deal with a large current although the size is small is obtained.

Further, since the conductive wire 22 is embedded inside the powder magnetic core 21, a void is hardly generated between the conductive wire 22 and the powder magnetic core 21. According to this, vibration of the powder magnetic core 21 due to magnetostriction is suppressed, and thus, it is also possible to suppress the generation of noise accompanying this vibration.

In the case where the choke coil 20 according to this embodiment as described above is produced, first, the conductive wire 22 is disposed in a cavity of a mold, and also the granular powder containing the soft magnetic powder according to the invention is filled in the cavity. That is, the granular powder is filled therein so that the conductive wire 22 is included therein.

Subsequently, the granular powder is compressed together with the conductive wire 22, whereby a molded body is obtained.

Subsequently, in the same manner as in the above-mentioned first embodiment, the obtained molded body is subjected to a heat treatment. By doing this, the binding material is cured, whereby the powder magnetic core 21 and the choke coil 20 (the magnetic element according to the invention) are obtained.

Method for Producing Soft Magnetic Powder

Next, a method for producing the soft magnetic powder according to the invention will be described.

The soft magnetic powder according to the invention may be produced by any production method, and is produced by, for example, any of a variety of powdering methods such as atomization methods (such as a water atomization method, a gas atomization method, and a spinning water atomization method), a reducing method, a carbonyl method, and a pulverization method.

As the atomization methods, there have been known a water atomization method, a gas atomization method, a spinning water atomization method, and the like, which are divided according to a difference in the type of a cooling medium or the configuration of a device. Among these, the soft magnetic powder according to the invention is preferably produced by an atomization method, more preferably produced by a water atomization method or a spinning water atomization method, and further more preferably produced by a spinning water atomization method. The atomization method is a method in which a molten metal (metal melt) is caused to collide with a fluid (liquid or gas) jetted at a high speed to atomize the molten metal and also cool the atomized metal, whereby a metal powder (soft magnetic powder) is produced. By producing the soft magnetic powder using such an atomization method, an extremely fine powder can be efficiently produced. Further, the shape of the particle of the obtained powder is closer to a spherical shape by the action of surface tension. Due to this, a soft magnetic powder having a high filling factor when producing a powder magnetic core is obtained. That is, a soft magnetic powder capable of producing a powder magnetic core having a high magnetic permeability and a high saturation magnetic flux density can be obtained.

The "water atomization method" as used herein refers to a method in which a solution such as water or an oil is used as a cooling liquid, and in a state where this solution is jetted in an inverted conical shape so as to converge on one point, the molten metal is allowed to flow down to this convergence point and collide with the cooling liquid so as to atomize the molten metal, whereby a metal powder is produced.

On the other hand, by using a spinning water atomization method, the metal melt can be cooled at an extremely high speed. Therefore, the metal melt can be solidified in a state where the chaotic atomic arrangement in the molten metal is highly maintained. Due to this, by performing a crystallization treatment thereafter, a soft magnetic powder having a crystalline structure with a uniform particle diameter can be efficiently produced.

Hereinafter, a method for producing the soft magnetic powder by a spinning water atomization method will be described.

In a spinning water atomization method, a cooling liquid is supplied by ejection along the inner circumferential surface of a cooling cylindrical body, and is spun along the inner circumferential surface of the cooling cylindrical body, whereby a cooling liquid layer is formed on the inner circumferential surface. On the other hand, the raw material of the soft magnetic powder is melted, and while allowing the obtained molten metal to freely fall, a liquid or gas jet is blown to the molten metal. By doing this, the molten metal is scattered, and the scattered molten metal is incorporated in the cooling liquid layer. As a result, the molten metal which is atomized by scattering is solidified by rapid cooling, and therefore, the soft magnetic powder is obtained.

Figure 3:
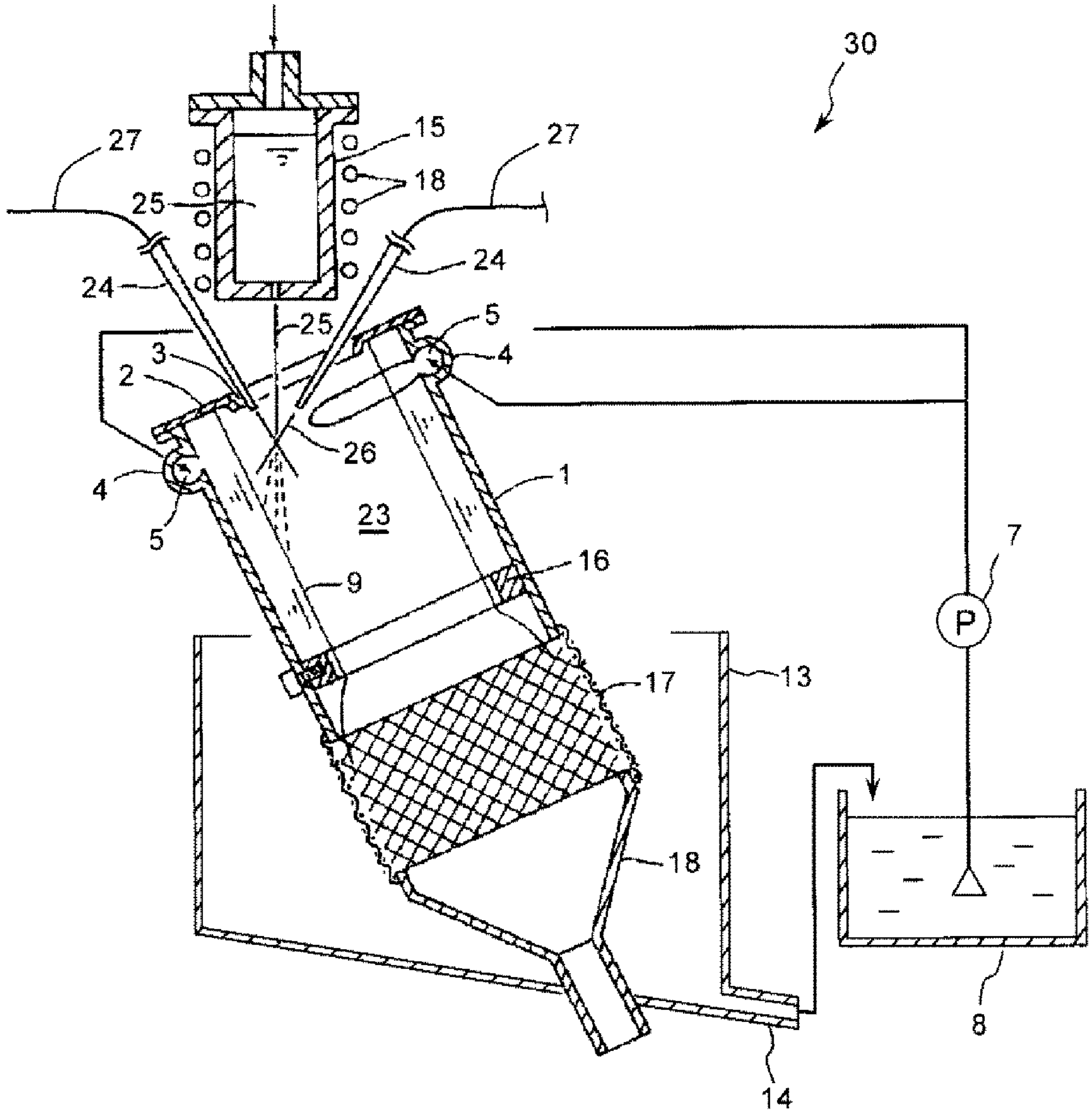
FIG. 3 is a longitudinal cross-sectional view showing one example of a device for producing a soft magnetic powder by a spinning water atomization method.

FIG. 3 is a longitudinal cross-sectional view showing one example of a device for producing the soft magnetic powder by a spinning water atomization method.

A powder production device 30 shown in FIG. 3 includes a cooling cylindrical body 1 for forming a cooling liquid layer 9 on an inner circumferential surface, a pot 15 which is a supply container for supplying and allowing a molten metal 25 to flow down to a space portion 23 on the inner side of the cooling liquid layer 9, a pump 7 which is a unit for supplying the cooling liquid to the cooling cylindrical body 1, and a jet nozzle 24 which ejects a gas jet 26 for breaking up the flowing down molten metal 25 in a thin stream into liquid droplets and also supplying the liquid droplets to the cooling liquid layer 9.

The cooling cylindrical body 1 has a cylindrical shape and is disposed so that the axis line of the cylindrical body is along the vertical direction or is tilted at an angle of 30° or less with respect to the vertical direction. Incidentally, the axis line of the cylindrical body is tilted with respect to the vertical direction in FIG. 3, however, the axis line of the cylindrical body may be in parallel with the vertical direction.

The upper end opening of the cooling cylindrical body 1 is closed by a lid 2, and in the lid 2, an opening section 3 for supplying the flowing down molten metal 25 to the space portion 23 of the cooling cylindrical body 1 is formed.

Further, in an upper portion of the cooling cylindrical body 1, a cooling liquid ejection tube 4 configured to be able to supply the cooling liquid by ejection in the tangential direction on the inner circumferential surface of the cooling cylindrical body 1 is provided. Then, a plurality of ejection ports 5 of the cooling liquid ejection tubes 4 are provided at equal intervals along the circumferential direction of the cooling cylindrical body 1. Further, the tube axis direction of the cooling liquid ejection tube 4 is set so that it is tilted downward at an angle of about 0° or more and 20° or less with respect to a plane orthogonal to the axis line of the cooling cylindrical body 1.

The cooling liquid ejection tube 4 is connected to a tank 8 via the pump 7 through a pipe, and the cooling liquid in the tank 8 sucked by the pump 7 is supplied by ejection into the cooling cylindrical body 1 through the cooling liquid ejection tube 4. By doing this, the cooling liquid gradually flows down while spinning along the inner circumferential surface of the cooling cylindrical body 1, and accompanying this, a layer of the cooling liquid (cooling liquid layer 9) along the inner circumferential surface is formed. Incidentally, a cooler may be interposed as needed in the tank 8 or in the middle of the circulation flow channel. As the cooling liquid, other than water, an oil (a silicone oil or the like) can be used, and further, any of a variety of additives may be added thereto. Further, by removing dissolved oxygen in the cooling liquid in advance, oxidation accompanying cooling of the powder to be produced can be suppressed.

Further, in a lower portion of the inner circumferential surface of the cooling cylindrical body 1, a layer thickness adjustment ring 16 for adjusting the layer thickness of the cooling liquid layer 9 is detachably provided. By providing this layer thickness adjustment ring 16, the flowing down speed of the cooling liquid is controlled, and therefore, the layer thickness of the cooling liquid layer 9 is ensured, and also the uniformity of the layer thickness can be achieved. The layer thickness adjustment ring 16 may be provided as needed.

Further, in a lower portion of the cooling cylindrical body 1, a liquid draining net body 17 having a cylindrical shape is continuously provided, and on the lower side of this liquid draining net body 17, a powder recovery container 18 having a funnel shape is provided. Around the liquid draining net body 17, a cooling liquid recovery cover 13 is provided so as to cover the liquid draining net body 17, and a drain port 14 formed in a bottom portion of this cooling liquid recovery cover 13 is connected to the tank 8 through a pipe.

Further, in the space portion 23, the jet nozzle 24 for ejecting a gas such as air or an inert gas is provided. This jet nozzle 24 is attached to the tip end of a gas supply tube 27 inserted through the opening section 3 of the lid 2 and is disposed such that the ejection port thereof is oriented to the molten metal 25 in a thin stream and further oriented to the cooling liquid layer 9 beyond the molten metal.

When a soft magnetic powder is produced by such a powder production device 30, first, the pump 7 is operated and the cooling liquid layer 9 is formed on the inner circumferential surface of the cooling cylindrical body 1, and then, the molten metal 25 in the pot 15 is allowed to flow down in the space portion 23. When the gas jet 26 is blown to this molten metal 25, the molten metal 25 is scattered, and the atomized molten metal 25 is incorporated in the cooling liquid layer 9. As a result, the atomized molten metal 25 is cooled and solidified, whereby a soft magnetic powder is obtained.

In the spinning water atomization method, by continuously supplying the cooling liquid, an extremely high cooling rate can be stably maintained, and therefore, the degree of amorphization of a soft magnetic powder to be produced is stabilized. As a result, by performing a crystallization treatment thereafter, a soft magnetic powder having a crystalline structure with a uniform particle diameter can be efficiently produced.

Further, the molten metal 25 atomized to a given size by the gas jet 26 falls by inertia until it is incorporated in the cooling liquid layer 9. Therefore, the liquid droplet is spheroidized at that time. As a result, a soft magnetic powder can be produced.

For example, the flow-down amount of the molten metal 25 which is allowed to flow down from the pot 15 varies depending also on the size of the device and is not particularly limited, but is preferably controlled to be 1 kg or less per minute. According to this, when the molten metal 25 is scattered, it is scattered as liquid droplets with an appropriate size, and therefore, a soft magnetic powder having an average particle diameter as described above is obtained. Further, by controlling the amount of the molten metal 25 to be supplied in a given time to a certain degree, also a sufficient cooling rate is obtained, and therefore, the degree of amorphization is increased, and thus, a soft magnetic powder having a crystalline structure with a uniform particle diameter is obtained. Incidentally, for example, by decreasing the flow-down amount of the molten metal 25 within the above range, it is possible to perform adjustment such that the average particle diameter is reduced.

On the other hand, the outer diameter of the thin stream of the molten metal 25 allowed to flow down from the pot 15, in other words, the inner diameter of the flow-down port of the pot 15 is not particularly limited, but is preferably 1 mm or less. According to this, it becomes easy to make the gas jet 26 uniformly hit the molten metal 25 in a thin stream, and therefore, it becomes easy to uniformly scatter the liquid droplets with an appropriate size. As a result, a soft magnetic powder having an average particle diameter as described above is obtained. Then, also in this case, the amount of the molten metal 25 to be supplied in a given time is controlled, and therefore, a cooling rate is also sufficiently obtained, and thus, sufficient amorphization can be achieved.

Further, the flow rate of the gas jet 26 is not particularly limited, but is preferably set to 100 m/s or more and 1000 m/s or less. According to this, also in this case, the molten metal 25 can be scattered as liquid droplets with an appropriate size, and therefore, a soft magnetic powder having an average particle diameter as described above is obtained. Further, the gas jet 26 has a sufficient speed, and therefore, a sufficient speed is also given to the scattered liquid droplets, and therefore, the liquid droplets become finer, and also the time until the liquid droplets are incorporated in the cooling liquid layer 9 is reduced. As a result, the liquid droplet can be spheroidized in a short time and also cooled in a short time, and thus, further amorphization can be achieved. For example, by increasing the flow rate of the gas jet 26 within the above range, it is possible to perform adjustment such that the average particle diameter is reduced.

Further, as other conditions, for example, it is preferred that the pressure when ejecting the cooling liquid to be supplied to the cooling cylindrical body 1 is set to about 50 MPa or more and 200 MPa or less, the liquid temperature is set to about −10° C. or higher and 40° C. or lower. According to this, the flow rate of the cooling liquid layer 9 is optimized, and the atomized molten metal 25 can be cooled appropriately and uniformly.

Further, when the raw material of the soft magnetic powder is melted, the melting temperature is preferably set to about Tm+20° C. or higher and Tm+200° C. or lower, more preferably set to about Tm+50° C. or higher and Tm+150° C. or lower wherein Tm represents the melting point of the raw material. According to this, when the molten metal 25 is atomized by the gas jet 26, the variation in the properties among particles can be suppressed to be particularly small, and also the amorphization of the soft magnetic powder can be more reliably achieved.

The gas jet 26 can also be substituted by a liquid jet as desired.

The cooling rate when cooling the molten metal in the atomization method is preferably $1\times10^{4}$° C./s or more, more preferably $1\times10^{5}$° C./s or more. By rapid cooling in this manner, a soft magnetic powder having a particularly high degree of amorphization is obtained, and finally, a soft magnetic powder having a crystalline structure with a uniform particle diameter is obtained. In addition, the variation in the compositional ratio among the particles of the soft magnetic powder can be suppressed.

The soft magnetic powder produced as described above is subjected to a crystallization treatment. By doing this, at least part of the amorphous structure is crystallized, whereby a crystalline structure is formed.

The crystallization treatment can be performed by subjecting the soft magnetic powder containing an amorphous structure to a heat treatment. The temperature of the heat treatment is not particularly limited, but is preferably 520° C. or higher and 640° C. or lower, more preferably 560° C. or higher and 630° C. or lower, further more preferably 570° C. or higher and 620° C. or lower. As for the time of the heat treatment, the time to maintain the powder at that temperature is set to preferably 1 minute or more and 180 minutes or less, more preferably 3 minutes or more and 120 minutes or less, further more preferably 5 minutes or more and 60 minutes or less. By setting the temperature and time of the heat treatment within the above ranges, respectively, the crystalline structure having a more uniform particle diameter can be generated more uniformly. As a result, a soft magnetic powder in which a crystalline structure having a particle diameter of 1 nm or more and 30 nm or less is contained in an amount of 40 vol % or more is obtained. This is considered to be because by incorporating a crystalline structure having a small and uniform particle diameter in a relatively large amount (40 vol % or more), an interaction at the interface between the crystalline structure and the amorphous structure is particularly dominant, and accompanying this, the hardness is increased as compared with the case where an amorphous structure is dominant or the case where a crystalline structure having a coarse particle diameter is contained in a large amount.

When the temperature or time of the heat treatment is less than the above lower limit, depending on the composition of the material of the soft magnetic powder or the like, the crystallization is insufficient, and also the uniformity of the particle diameter is poor, and therefore, the interaction at the interface between the crystalline structure and the amorphous structure cannot be obtained, and therefore, there is a fear that the hardness may be insufficient. Due to this, the resistivity in a green compact is decreased, and thus, there is a fear that high insulating properties between particles cannot be ensured. On the other hand, when the temperature or time of the heat treatment exceeds the above upper limit, depending on the composition of the material of the soft magnetic powder or the like, crystallization proceeds excessively, and also the uniformity of the particle diameter is poor, and therefore, the interface between the crystalline structure and the amorphous structure is decreased, and also in this case, there is a fear that the hardness may be insufficient. Due to this, the resistivity in a green compact is decreased, and therefore, there is a fear that high insulating properties between particles cannot be ensured.

The atmosphere of the crystallization treatment is not particularly limited, but is preferably an inert gas atmosphere such as nitrogen or argon, a reducing gas atmosphere such as hydrogen or an ammonia decomposition gas, or a reduced pressure atmosphere obtained by reducing the pressure of such an atmosphere. According to this, crystallization can be achieved while suppressing oxidation of the metal, and thus, a soft magnetic powder having excellent magnetic properties is obtained.

In this manner, a soft magnetic powder according to the invention can be produced.

The thus obtained soft magnetic powder may be classified as needed. Examples of the classification method include dry classification such as sieve classification, inertial classification, centrifugal classification, and wind power classification, and wet classification such as sedimentation classification.

Further, an insulating film may be formed on the surface of each particle of the thus obtained soft magnetic powder as needed. Examples of the constituent material of this insulating film include inorganic materials such as phosphates such as magnesium phosphate, calcium phosphate, zinc phosphate, manganese phosphate, and cadmium phosphate, and silicates (liquid glass) such as sodium silicate. In addition, a material which is appropriately selected from the organic materials listed as the constituent material of the binding material described above may be used.

Electronic Device

Next, an electronic device (the electronic device according to the invention) including the magnetic element according to the invention will be described in detail with reference to FIGS. 4 to 6.

Figure 4:
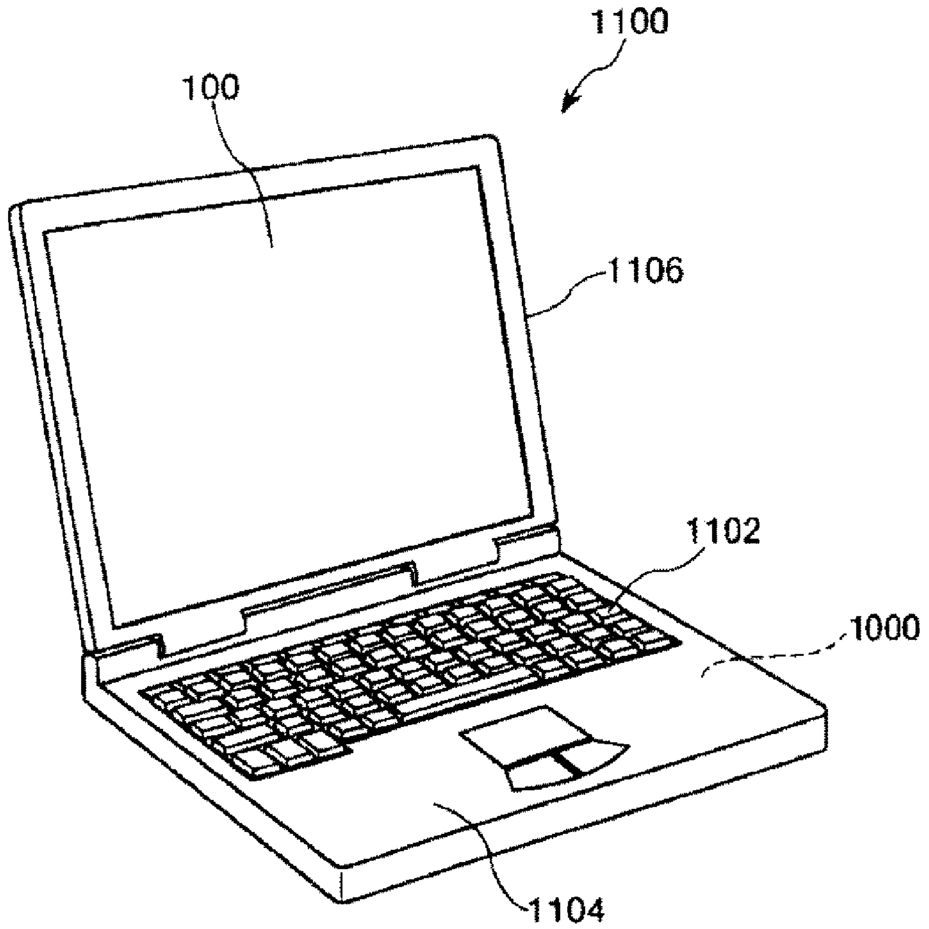
FIG. 4 is a perspective view showing a structure of a mobile (or notebook) personal computer, to which an electronic device including a magnetic element according to the invention is applied.

FIG. 4 is a perspective view showing a structure of a mobile (or notebook) personal computer, to which an electronic device including the magnetic element according to the invention is applied. In this drawing, a personal computer 1100 includes a main body 1104 provided with a key board 1102, and a display unit 1106 provided with a display section 100. The display unit 1106 is supported rotatably with respect to the main body 1104 via a hinge structure. Such a personal computer 1100 has, for example, a built-in magnetic element 1000 such as a choke coil, an inductor, or a motor for a switching power supply.

Figure 5:
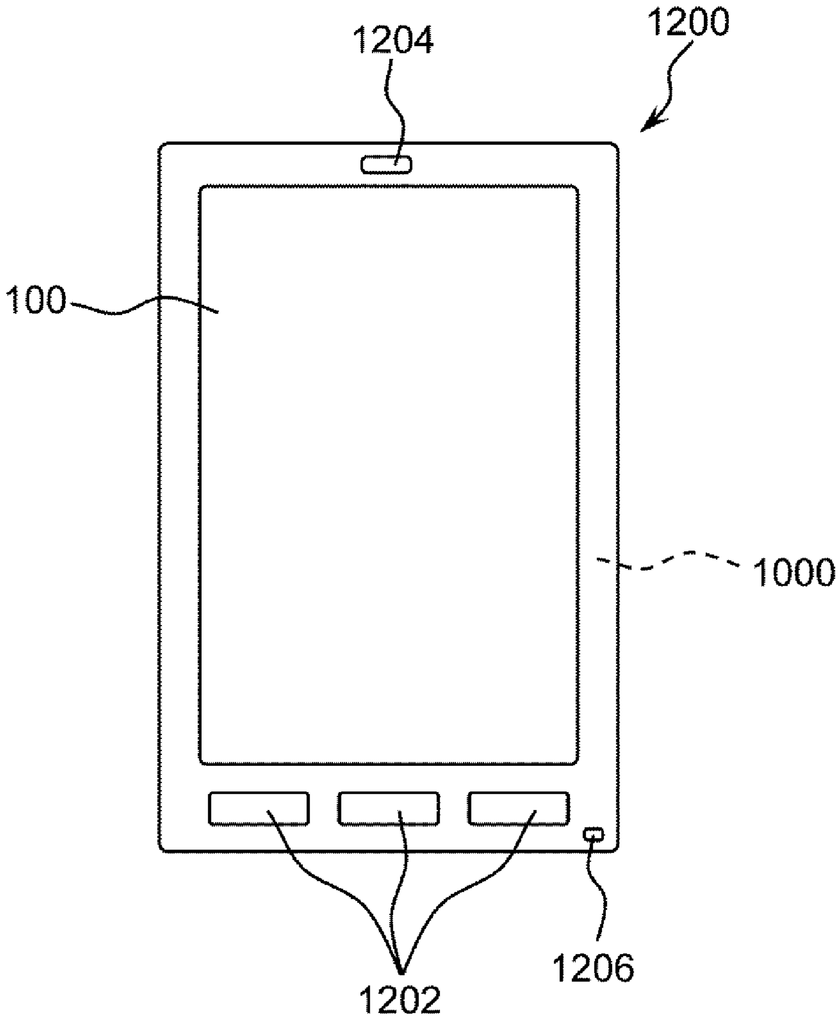
FIG. 5 is a plan view showing a structure of a smartphone, to which an electronic device including a magnetic element according to the invention is applied.

FIG. 5 is a plan view showing a structure of a smartphone, to which an electronic device including the magnetic element according to the invention is applied. In this drawing, a smartphone 1200 includes a plurality of operation buttons 1202, an earpiece 1204, and a mouthpiece 1206, and between the operation buttons 1202 and the earpiece 1204, a display section 100 is placed. Such a smartphone 1200 has, for example, a built-in magnetic element 1000 such as an inductor, a noise filter, or a motor.

Figure 6:
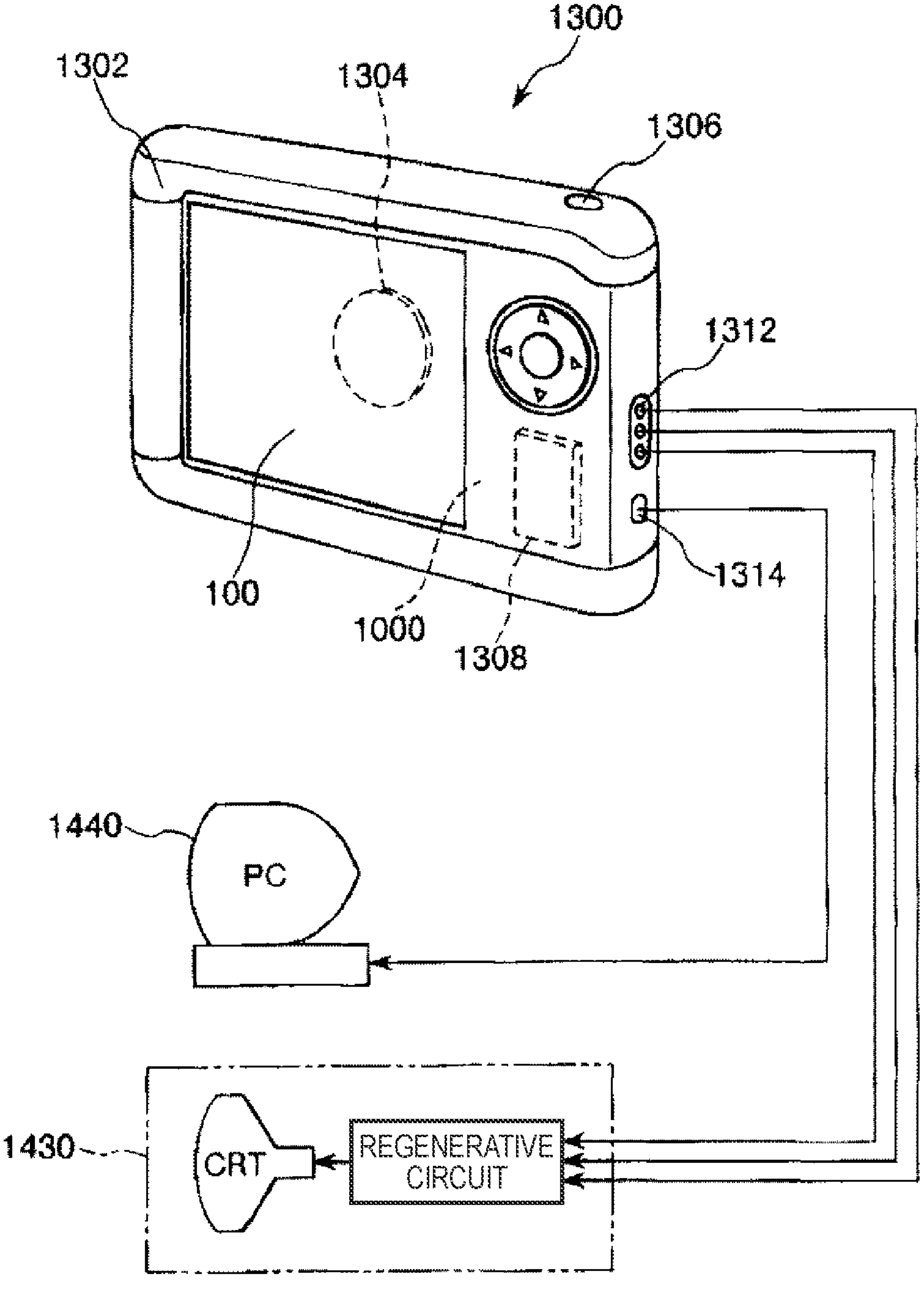
FIG. 6 is a perspective view showing a structure of a digital still camera, to which an electronic device including a magnetic element according to the invention is applied.

FIG. 6 is a perspective view showing a structure of a digital still camera, to which an electronic device including the magnetic element according to the invention is applied. In this drawing, connection to external devices is also briefly shown. A digital still camera 1300 generates an imaging signal (image signal) by photoelectrically converting an optical image of a subject into the imaging signal by an imaging device such as a CCD (Charge Coupled Device).

On a back surface of a case (body) 1302 in the digital still camera 1300, a display section 100 is provided, and the display section 100 is configured to display an image taken on the basis of the imaging signal by the CCD. The display section 100 functions as a finder which displays a subject as an electronic image. Further, on a front surface side (on a back surface side in the drawing) of the case 1302, a light receiving unit 1304 including an optical lens (an imaging optical system), a CCD, or the like is provided.

When a person who takes a picture confirms an image of a subject displayed on the display section 100 and pushes a shutter button 1306, an imaging signal of the CCD at that time is transferred to a memory 1308 and stored there. Further, a video signal output terminal 1312 and an input/output terminal 1314 for data communication are provided on a side surface of the case 1302 in this digital still camera 1300. As shown in the drawing, a television monitor 1430 and a personal computer 1440 are connected to the video signal output terminal 1312 and the input/output terminal 1314 for data communication, respectively, as needed. Moreover, the digital still camera 1300 is configured such that the imaging signal stored in the memory 1308 is output to the television monitor 1430 or the personal computer 1440 by a predetermined operation. Also such a digital still camera 1300 has, for example, a built-in magnetic element 1000 such as an inductor or a noise filter.

Incidentally, the electronic device including a magnetic element according to the invention can be applied to, other than the personal computer (mobile personal computer) shown in FIG. 4, the smartphone shown in FIG. 5, and the digital still camera shown in FIG. 6, for example, cellular phones, tablet terminals, timepieces, inkjet type ejection devices (such as inkjet printers), laptop personal computers, televisions, video cameras, videotape recorders, car navigation devices, pagers, electronic notebooks (including those having a communication function), electronic dictionaries, electronic calculators, electronic game devices, word processors, work stations, television telephones, television monitors for crime prevention, electronic binoculars, POS terminals, medical devices (such as electronic thermometers, blood pressure meters, blood sugar meters, electrocardiogram monitoring devices, ultrasound diagnostic devices, and electronic endoscopes), fish finders, various measurement devices, gauges (such as gauges for vehicles, airplanes, and ships), mobile body controlling devices (such as controlling devices for driving vehicles), flight simulators, and the like.

As described above, such an electronic device includes the magnetic element according to the invention. Therefore, a reduction in size and weight of the electronic device is easily achieved.

Hereinabove, the soft magnetic powder, the powder magnetic core, the magnetic element, and the electronic device according to the invention have been described based on the preferred embodiments, but the invention is not limited thereto.

For example, in the above-mentioned embodiments, as the application example of the soft magnetic powder according to the invention, the powder magnetic core is described, however, the application example is not limited thereto, and for example, it may be applied to a magnetic fluid, a magnetic shielding sheet, or a magnetic device such as a magnetic head.

Further, the shapes of the powder magnetic core and the magnetic element are also not limited to those shown in the drawings, and may be any shapes.

Examples

Next, specific examples of the invention will be described.

1. Production of Powder Magnetic Core

Sample No. 1

(1) First, the raw material was melted in a high-frequency induction furnace, and also powdered by a spinning water atomization method, whereby a soft magnetic powder was obtained. At this time, the flow-down amount of the molten metal to be allowed to flow down from the pot was set to 0.5 kg/min, the inner diameter of the flow-down port of the pot was set to 1 mm, and the flow rate of the gas jet was set to 900 m/s. Subsequently, classification was performed by a wind power classifier. The alloy composition of the obtained soft magnetic powder is shown in Table 1. Incidentally, in the determination of the alloy composition, an optical emission spectrometer for solids (a spark emission spectrometer), model: Spectrolab, type: LAVMB08A manufactured by SPECTRO Analytical Instruments GmbH was used.

(2) Subsequently, with respect to the obtained soft magnetic powder, a particle size distribution was measured. This measurement was performed using a laser diffraction particle size distribution analyzer (Microtrack HRA9320-X100, manufactured by Nikkiso Co., Ltd.). Then, the D50 (average particle diameter) of the soft magnetic powder was determined based on the particle size distribution, and found to be 20 μm.

(3) Subsequently, the obtained soft magnetic powder was heated at 560° C. for 15 minutes in a nitrogen atmosphere. By doing this, the amorphous structure in the particles was crystallized.

(4) Subsequently, the obtained soft magnetic powder was mixed with an epoxy resin (a binding material) and toluene (an organic solvent), whereby a mixture was obtained. The addition amount of the epoxy resin was set to 2 parts by mass with respect to 100 parts by mass of the soft magnetic powder.

(5) Subsequently, the obtained mixture was stirred, and then dried in a short time, whereby a block-shaped dry material was obtained. Then, the thus obtained dry material was sieved through a sieve with a mesh size of 400 μm, and then pulverized, whereby a granular powder was obtained. The thus obtained granular powder was dried at 50° C. for 1 hour.

(6) Subsequently, the obtained granular powder was filled in a mold, and a molded body was obtained under the following molding conditions.

Molding Conditions

Molding method: press-molding

Shape of molded body: ring shape

Size of molded body: outer diameter: 28 mm, inner diameter: 14 mm, thickness: 5 mm Molding pressure: 1 t/cm$^2$ (98 MPa)

(7) Subsequently, the molded body was heated in an air atmosphere at a temperature of 150° C. for 0.75 hours to cure the binding material. By doing this, a powder magnetic core was obtained.

Sample Nos. 2 to 32

Powder magnetic cores were obtained in the same manner as for Sample No. 1 except that as the soft magnetic powder, those shown in Table 1 were used, respectively. The average particle diameter D50 of each sample fell within the range of 3 μm or more and 30 μm or less.

Sample Nos. 33 to 45

Powder magnetic cores were obtained in the same manner as for Sample No. 1 except that as the soft magnetic powder, those shown in Table 2 were used, respectively. The average particle diameter D50 of each sample fell within the range of 3 μm or more and 30 μm or less.

TABLE 1

| | | | | | Alloy composition, etc. | | | | | | | | | | | | | | | | | | |
|---|---|---|---|---|---|---|---|---|---|---|---|---|---|---|---|---|---|---|---|---|---|---|---|
| | | | | | | | | | M | | | | | | M' | | X | | | | | | |
| Sample No. | Ex. / Comp. Ex. | Type of atomization method | Temperature of crystallization ° C. | Time of crystallization min | Fe | Cu | Si | B | Nb | W | Ta | Zr | Hf | Mo at % | Cr | Pt | C | Ge | Ga | Al | Ti | Total | O ppm |
| No. 1 | Ex. | spinning water | 560 | 15 | bal. | 1.0 | 13.5 | 9.0 | 3.0 | | | | | | | | | | | 0.012 | 0.011 | 100.0 | 610 |
| No. 2 | Ex. | spinning water | 570 | 15 | bal. | 1.0 | 13.5 | 9.0 | 3.0 | | | | | | | | | | | 0.012 | 0.011 | 100.0 | 560 |
| No. 3 | Ex. | spinning water | 570 | 69 | bal. | 1.0 | 13.5 | 9.0 | 3.0 | | | | | | | | | | | 0.012 | 0.011 | 100.0 | 420 |
| No. 4 | Ex. | spinning water | 570 | 120 | bal. | 1.0 | 13.5 | 9.0 | 3.0 | | | | | | | | | | | 0.012 | 0.011 | 100.0 | 530 |
| No. 5 | Ex. | spinning water | 580 | 15 | bal. | 1.0 | 13.5 | 9.0 | 3.0 | | | | | | | | | | | 0.012 | 0.011 | 100.0 | 320 |
| No. 6 | Ex. | spinning water | 580 | 60 | bal. | 1.0 | 13.5 | 9.0 | 3.0 | | | | | | | | | | | 0.012 | 0.011 | 100.0 | 280 |
| No. 7 | Ex. | spinning water | 580 | 120 | bal. | 1.0 | 13.5 | 9.0 | 3.0 | | | | | | | | | | | 0.012 | 0.011 | 100.0 | 220 |
| No. 8 | Ex. | spinning water | 600 | 15 | bal. | 1.0 | 13.5 | 9.0 | 3.0 | | | | | | | | | | | 0.012 | 0.011 | 100.0 | 180 |
| No. 9 | Ex. | spinning water | 600 | 60 | bal. | 1.0 | 13.5 | 9.0 | 3.0 | | | | | | | | | | | 0.012 | 0.011 | 100.0 | 170 |
| No. 10 | Ex. | spinning water | 640 | 15 | bal. | 1.0 | 13.5 | 9.0 | 3.0 | | | | | | | | | | | 0.012 | 0.011 | 100.0 | 240 |
| No. 11 | Ex. | spinning water | 660 | 15 | bal. | 1.0 | 13.5 | 9.0 | 3.0 | | | | | | | | | | | 0.012 | 0.011 | 100.0 | 450 |
| No. 12 | Ex. | spinning water | 680 | 15 | bal. | 1.0 | 13.5 | 9.0 | 3.0 | | | | | | | | | | | 0.012 | 0.011 | 100.0 | 680 |
| No. 13 | Ex. | spinning water | 575 | 15 | bal. | 1.0 | 13.0 | 10.0 | 3.0 | | | | | | | | | | | 0.002 | 0.002 | 100.0 | 540 |
| No. 14 | Ex. | spinning water | 605 | 15 | bal. | 1.0 | 13.0 | 9.0 | 3.0 | | | | | | | | | | | 0.008 | 0.007 | 100.0 | 250 |
| No. 15 | Ex. | spinning water | 570 | 15 | bal. | 1.0 | 15.0 | 7.0 | | | | | | 4.0 | | | | | | 0.011 | 0.016 | 100.0 | 390 |
| No. 16 | Ex. | spinning water | 610 | 15 | bal. | 1.5 | 14.0 | 7.0 | | | 5.5 | | | | | | | | | 0.008 | 0.005 | 100.0 | 240 |
| No. 17 | Ex. | spinning water | 680 | 15 | bal. | 1.2 | 13.0 | 9.0 | 5.0 | | | | | | | | | 0.5 | | 0.003 | 0.005 | 100.0 | 640 |
| No. 18 | Ex. | spinning water | 575 | 15 | bal. | 1.0 | 14.0 | 8.0 | | | | | | 5.0 | | | | | | 0.020 | 0.004 | 100.0 | 540 |
| No. 19 | Ex. | spinning water | 570 | 15 | bal. | 1.1 | 8.0 | 9.0 | 3.0 | | | | 1.0 | | | | | | | 0.010 | 0.004 | 100.0 | 530 |
| No. 20 | Ex. | spinning water | 570 | 15 | bal. | 0.8 | 15.0 | 8.0 | 5.0 | | | 0.5 | | | 0.5 | | | | | 0.009 | 0.005 | 100.0 | 510 |
| No. 21 | Ex. | spinning water | 600 | 15 | bal. | 1.3 | 16.0 | 7.0 | 5.0 | | | | | | | | | | 1.0 | 0.008 | 0.006 | 100.0 | 170 |
| No. 22 | Ex. | spinning water | 610 | 15 | bal. | 1.0 | 17.0 | 8.0 | 4.0 | | | 0.5 | | | | | | 0.5 | | 0.005 | 0.007 | 100.0 | 190 |
| No. 23 | Ex. | spinning water | 575 | 15 | bal. | 0.8 | 15.0 | 8.0 | 5.0 | | | | | | 0.5 | | | | | 0.014 | 0.013 | 100.0 | 350 |
| No. 24 | Ex. | spinning water | 570 | 15 | bal. | 1.0 | 7.0 | 8.0 | | 2.0 | 1.0 | | | | | | 5.0 | | | 0.013 | 0.012 | 100.0 | 340 |
| No. 25 | Ex. | spinning water | 530 | 15 | bal. | 0.5 | 6.0 | 11.0 | 1.0 | | | | | | 2.0 | 1.0 | | | | 0.032 | 0.027 | 100.0 | 580 |
| No. 26 | Ex. | spinning water | 565 | 15 | bal. | 1.1 | 15.0 | 7.0 | | | 3.0 | | | | | | 0.5 | | | 0.011 | 0.005 | 100.0 | 540 |
| No. 27 | Ex. | jet water | 570 | 10 | bal. | 1.0 | 13.5 | 9.0 | 3.0 | | | | | | | | | | | 0.012 | 0.011 | 100.0 | 680 |
| No. 28 | Ex. | jet water | 570 | 10 | bal. | 1.2 | 13.0 | 9.0 | 5.0 | | | | | | | | | 0.5 | | 0.005 | 0.007 | 100.0 | 670 |
| No. 29 | Comp. Ex. | spinning water | 500 | 15 | bal. | 1.0 | 13.5 | 9.0 | 3.0 | | | | | | | | | | | 0.010 | 0.008 | 100.0 | 1440 |
| No. 30 | Comp. Ex. | spinning water | 510 | 15 | bal. | 1.2 | 13.0 | 9.0 | 5.0 | | | | | | | | | 0.5 | | 0.008 | 0.008 | 100.0 | 1510 |
| No. 31 | Comp. Ex. | spinning water | 560 | 15 | bal. | 1.0 | 13.5 | 9.0 | 3.0 | | | | | | | | | | | 0.000 | 0.041 | 100.0 | 640 |
| No. 32 | Comp. Ex. | spinning water | 560 | 15 | bal. | 1.2 | 13.0 | 9.0 | 5.0 | | | | | | | | | 0.5 | | 0.000 | 0.046 | 100.0 | 580 |

TABLE 2

| Sample No. | Ex. / Comp. Ex. | Type of atomization method | Temperature of crystallization ° C. | Time of crystallization min | Alloy composition, etc. Fe | Cu | Si | B | M Nb | W | Ta | Zr |
|---|---|---|---|---|---|---|---|---|---|---|---|---|
| | | | | | At % | | | | | | | |
| No. 33 | Ex. | spinning water | 600 | 15 | bal. | 1.0 | 13.5 | 9.0 | 3.0 | | | |
| No. 34 | Ex. | spinning water | 600 | 15 | bal. | 1.0 | 13.5 | 9.0 | 3.0 | | | |
| No. 35 | Ex. | spinning water | 600 | 15 | bal. | 1.0 | 13.5 | 9.0 | 3.0 | | | |
| No. 36 | Ex. | spinning water | 600 | 15 | bal. | 1.0 | 13.5 | 9.0 | 3.0 | | | |
| No. 37 | Ex. | spinning water | 600 | 15 | bal. | 1.0 | 13.5 | 9.0 | 3.0 | | | |
| No. 38 | Ex. | spinning water | 600 | 15 | bal. | 1.0 | 13.5 | 9.0 | 3.0 | | | |
| No. 39 | Comp. Ex. | spinning water | 600 | 15 | bal. | 1.0 | 13.5 | 9.0 | 3.0 | | | |
| No. 40 | Comp. Ex. | spinning water | 600 | 15 | bal. | 1.0 | 13.5 | 9.0 | 3.0 | | | |
| No. 41 | Comp. Ex. | spinning water | 600 | 15 | bal. | 1.0 | 13.5 | 9.0 | 3.0 | | | |
| No. 42 | Comp. Ex. | spinning water | 600 | 15 | bal. | 1.0 | 13.5 | 9.0 | 3.0 | | | |
| No. 43 | Comp. Ex. | spinning water | 600 | 15 | bal. | 1.0 | 13.5 | 9.0 | 3.0 | | | |
| No. 44 | Comp. Ex. | spinning water | 600 | 15 | bal. | 1.0 | 13.5 | 9.0 | 3.0 | | | |
| No. 45 | Comp. Ex. | spinning water | 600 | 15 | bal. | 1.0 | 13.5 | 9.0 | 3.0 | | | |

| Sample No. | Alloy composition, etc. M Hf | Mo | M' Cr | Pt | X C | Ge | Ga | Al | Ti | Total | O ppm |
|---|---|---|---|---|---|---|---|---|---|---|---|
| | At % | | | | | | | | | | |
| No. 33 | | | | | | | | 0.013 | 0.011 | 100.0 | 620 |
| No. 34 | | | | | | | | 0.011 | 0.015 | 100.0 | 570 |
| No. 35 | | | | | | | | 0.012 | 0.003 | 100.0 | 430 |
| No. 36 | | | | | | | | 0.012 | 0.001 | 100.0 | 670 |
| No. 37 | | | | | | | | 0.012 | 0.002 | 100.0 | 680 |
| No. 38 | | | | | | | | 0.012 | 0.018 | 100.0 | 650 |
| No. 39 | | | | | | | | 0.001 | 0.002 | 100.0 | 420 |
| No. 40 | | | | | | | | 0.041 | 0.005 | 100.0 | 580 |
| No. 41 | | | | | | | | 0.042 | 0.008 | 100.0 | 680 |
| No. 42 | | | | | | | | 0.035 | 0.006 | 100.0 | 710 |
| No. 43 | | | | | | | | 0.035 | 0.009 | 100.0 | 1040 |
| No. 44 | | | | | | | | 0.033 | 0.005 | 100.0 | 1250 |
| No. 45 | | | | | | | | 0.033 | 0.039 | 100.0 | 1340 |

In Tables 1 and 2, the spinning water atomization method is denoted by "spinning water", and the water atomization method is denoted by "jet water".

Further, in Tables 1 and 2, among the soft magnetic powders of the respective sample Nos., those corresponding to the invention are denoted by "Ex." (Example), and those not corresponding to the invention are denoted by "Com. Ex." (Comparative Example).

Further, the description "bal." in Tables 1 and 2 indicates that Fe is the remainder (balance) of the alloy composition excluding the other elements.

2. Evaluation of Soft Magnetic Powder and Powder Magnetic Core

2.1. Measurement of Magnetic Properties of Soft Magnetic Powder

2.1.1. Measurement of Coercive Force of Soft Magnetic Powder

With respect to each of the soft magnetic powders obtained in the respective Examples and Comparative Examples, the coercive force was measured under the following measurement conditions. The measurement results of the coercive forces of the soft magnetic powders shown in Table 2 are shown in Table 4.

Measurement Conditions for Coercive Force

Measurement device: magnetometer (VSM system, TM-VSM 1230-MHHL, manufactured by Tamakawa Co., Ltd.)

On the other hand, with respect to the coercive forces of the soft magnetic powders shown in Table 1, the measured coercive forces were evaluated according to the following evaluation criteria.

Evaluation Criteria for Coercive Force

A: The coercive force is less than 0.5.

B: The coercive force is 0.5 or more and less than 1.0.

C: The coercive force is 1.0 or more and less than 1.33.

D: The coercive force is 1.33 or more and less than 1.67.

E: The coercive force is 1.67 or more and less than 2.0.

F: The coercive force is 2.0 or more.

The evaluation results are shown in Table 3.

2.1.2. Measurement of Magnetic Permeability of Soft Magnetic Powder

With respect to each of the soft magnetic powders obtained in the respective Examples and Comparative Examples, the magnetic permeability was measured under the following measurement conditions.

Measurement Conditions for Magnetic Permeability

Measurement device: impedance analyzer (HEWLETT PACKARD 4194A)

Measurement frequency: 100 kHz

Number of turns of coil wire: 7

Diameter of coil wire: 0.8 mm

The evaluation results are shown in Tables 3 and 4.

2.2. Measurement of Contents of Crystalline Structure and Amorphous Structure of Soft Magnetic Powder With respect to each of the soft magnetic powders obtained in the respective Examples and Comparative Examples, the particle was cut at a plane including the major axis. Then, the cut surface was observed with a transmission electron microscope, and the crystalline structure and the amorphous structure were specified.

Subsequently, the particle diameter of the crystalline structure was measured from the observation image, and the area ratio of the crystalline structure having a particle diameter in a specific range (1 nm or more and 30 nm or less) was determined, and the determined area ratio was regarded as the content (vol %) of the crystalline structure having a predetermined particle diameter.

Subsequently, the area ratio of the amorphous structure was determined, and the determined area ratio was regarded as the content (vol %) of the amorphous structure, and also the ratio of the content of the amorphous structure to the content of the crystalline structure having a predetermined particle diameter (amorphous/crystalline) was determined.

The measurement results are shown in Tables 3 and 4.

2.3. Measurement of Average Crystalline Particle Diameter of Soft Magnetic Powder With respect to each of the soft magnetic powders obtained in the respective Examples and Comparative Examples, the average particle diameter of the crystalline structure was determined based on the width of a diffraction peak obtained by X-ray diffractometry.

The measurement results are shown in Tables 3 and 4.

2.4. Measurement of Vickers Hardness of Soft Magnetic Powder

With respect to each of the soft magnetic powders obtained in the respective Examples and Comparative Examples, the particle was cut at a plane including the major axis. Then, the Vickers hardness was measured using a Micro Vickers hardness tester in a central portion of the cut surface.

The measurement results are shown in Tables 3 and 4.

2.5. Measurement of Volume Resistivity of Soft Magnetic Powder

With respect to each of the soft magnetic powders obtained in the respective Examples and Comparative Examples, the volume resistivity when the soft magnetic powder was formed into a green compact was measured using a digital multimeter.

The measurement results are shown in Tables 3 and 4.

2.6. Measurement of Electrical Breakdown Voltage of Powder Magnetic Core

With respect to each of the powder magnetic cores obtained in the respective Examples and Comparative Examples, the electrical breakdown voltage was measured.

Specifically, after a pair of electrodes were placed in the powder magnetic core, a DC voltage of 50 V was applied between the electrodes, and an electrical resistance between the electrodes was measured using an automatic withstanding voltage insulation resistance tester (TOS9000, Kikusui Electronics Corporation).

Thereafter, while increasing the voltage by 50 V, the measurement of the electrical resistance was repeatedly performed in the same manner as described above. Then, the voltage when the measurement was below the measurement limit of the electrical resistance was recorded as the electrical breakdown voltage.

The measurement results are shown in Tables 3 and 4.

TABLE 3

| | | Evaluation results | | | | | | | | |
|---|---|---|---|---|---|---|---|---|---|---|
| Sample No. | Ex. / Comp. Ex. | Content of crystalline structure having predetermined particle diameter Vol % | Content of amorphous structure Vol % | amorphous / crystalline — | Average crystalline particle diameter nm | Coercive Force — | Magnetic permeability — | Vickers hardness — | Volume resistivity kΩ · cm | Electrical breakdown voltage V |
| No. 1 | Ex. | 60 | 40 | 66.7 | 8.6 | B | 21.8 | 1250 | 2.3 | 800 |
| No. 2 | Ex. | 72 | 28 | 38.9 | 9.3 | B | 22.0 | 1290 | 5.3 | 1000 |
| No. 3 | Ex. | 74 | 26 | 35.1 | 9.5 | B | 22.1 | 1300 | 5.5 | 1000 |
| No. 4 | Ex. | 76 | 24 | 31.6 | 9.7 | B | 22.2 | 1310 | 5.7 | >1000 |
| No. 5 | Ex. | 84 | 16 | 19.0 | 10.1 | A | 22.3 | 1350 | 32.5 | >1000 |
| No. 6 | Ex. | 86 | 14 | 16.3 | 10.3 | A | 22.4 | 1360 | 33.1 | >1000 |
| No. 7 | Ex. | 88 | 12 | 13.6 | 10.5 | A | 22.6 | 1370 | 34.6 | >1000 |
| No. 8 | Ex. | 88 | 12 | 13.6 | 11.3 | A | 23.1 | 1410 | 51.8 | >1000 |
| No. 9 | Ex. | 90 | 10 | 11.1 | 11.5 | A | 23.2 | 1420 | 52.4 | >1000 |
| No. 10 | Ex. | 70 | 30 | 42.9 | 18.5 | A | 22.5 | 1220 | 3.1 | >1000 |
| No. 11 | Ex. | 62 | 38 | 61.3 | 21.2 | B | 21.7 | 1150 | 2.0 | 950 |
| No. 12 | Ex. | 54 | 46 | 85.2 | 23.4 | C | 21.6 | 1110 | 1.5 | 900 |
| No. 13 | Ex. | 78 | 22 | 28.2 | 9.6 | B | 22.0 | 1300 | 4.3 | 1000 |
| No. 14 | Ex. | 91 | 9 | 9.9 | 11.5 | A | 22.8 | 1380 | 44.1 | >1000 |
| No. 15 | Ex. | 71 | 29 | 40.8 | 9.4 | B | 22.0 | 1280 | 4.6 | 1000 |
| No. 16 | Ex. | 98 | 2 | 2.0 | 12.3 | A | 22.5 | 1360 | 50.3 | >1000 |
| No. 17 | Ex. | 55 | 45 | 81.8 | 25.4 | C | 21.5 | 1060 | 1.2 | 900 |
| No. 18 | Ex. | 60 | 40 | 66.7 | 8.4 | B | 21.2 | 1270 | 4.6 | 1000 |
| No. 19 | Ex. | 73 | 27 | 37.0 | 9.2 | B | 21.9 | 1270 | 4.3 | 1000 |
| No. 20 | Ex. | 74 | 26 | 35.1 | 9.1 | B | 21.9 | 1260 | 5.2 | 950 |
| No. 21 | Ex. | 88 | 12 | 13.6 | 11.2 | A | 23.2 | 1400 | 53.6 | >1000 |
| No. 22 | Ex. | 94 | 6 | 6.4 | 13.5 | A | 22.2 | 1340 | 55.4 | >1000 |
| No. 23 | Ex. | 75 | 25 | 33.3 | 9.4 | B | 21.3 | 1270 | 6.3 | 1000 |

TABLE 3-continued

| | | Evaluation results | | | | | | | | |
|---|---|---|---|---|---|---|---|---|---|---|
| Sample No. | Ex. / Comp. Ex. | Content of crystalline structure having predetermined particle diameter Vol % | Content of amorphous structure Vol % | amorphous / crystalline — | Average crystalline particle diameter nm | Coercive Force — | Magnetic permeability — | Vickers hardness — | Volume resistivity kΩ · cm | Electrical breakdown voltage V |
| No. 24 | Ex. | 70 | 30 | 42.9 | 8.4 | B | 21.2 | 1240 | 5.1 | 1000 |
| No. 25 | Ex. | 50 | 50 | 100.0 | 4.8 | D | 21.1 | 1220 | 1.2 | 800 |
| No. 26 | Ex. | 64 | 36 | 56.3 | 9.0 | B | 22.0 | 1260 | 2.8 | 800 |
| No. 27 | Ex. | 46 | 54 | 117.4 | 28.5 | D | 21.1 | 1150 | 2.2 | 750 |
| No. 28 | Ex. | 48 | 52 | 108.3 | 26.4 | D | 21.0 | 1190 | 5.2 | 750 |
| No. 29 | Comp. Ex. | 25 | 75 | 300.0 | 2.1 | E | 20.8 | 920 | 0.0 | 650 |
| No. 30 | Comp. Ex. | 32 | 68 | 212.5 | 2.5 | E | 20.7 | 950 | 0.0 | 700 |
| No. 31 | Comp. Ex. | 43 | 57 | 132.6 | 5.6 | D | 19.6 | 950 | 0.2 | 700 |
| No. 32 | Comp. Ex. | 47 | 53 | 112.8 | 6.4 | D | 19.7 | 880 | 0.1 | 700 |

TABLE 4

| | | Evaluation results | | | | | | | | |
|---|---|---|---|---|---|---|---|---|---|---|
| Sample No. | Ex. / Comp. Ex. | Content of crystalline structure having predetermined particle diameter Vol % | Content of amorphous structure Vol % | amorphous / crystalline — | Average crystalline particle diameter nm | Coercive Force Oe | Magnetic permeability — | Vickers hardness — | Volume resistivity kΩ · cm | Electrical breakdown voltage V |
| No. 33 | Ex. | 87 | 13 | 14.9 | 10.4 | 0.43 | 23.0 | 1420 | 51.8 | >1000 |
| No. 34 | Ex. | 86 | 14 | 16.3 | 10.3 | 0.59 | 23.0 | 1430 | 51.5 | >1000 |
| No. 35 | Ex. | 88 | 12 | 13.6 | 10.6 | 0.39 | 23.4 | 1440 | 53.5 | >1000 |
| No. 36 | Ex. | 89 | 11 | 12.4 | 10.4 | 0.66 | 22.2 | 1420 | 52.5 | >1000 |
| No. 37 | Ex. | 88 | 12 | 13.6 | 10.3 | 0.64 | 22.4 | 1430 | 51.4 | >1000 |
| No. 38 | Ex. | 75 | 25 | 33.3 | 11.0 | 0.71 | 22.0 | 1380 | 5.6 | 1000 |
| No. 39 | Comp. Ex. | 86 | 14 | 16.3 | 10.3 | 0.76 | 20.9 | 930 | 0.3 | 700 |
| No. 40 | Comp. Ex. | 88 | 12 | 13.6 | 10.4 | 0.77 | 20.8 | 940 | 0.3 | 700 |
| No. 41 | Comp. Ex. | 85 | 15 | 17.6 | 10.2 | 0.78 | 20.6 | 920 | 0.3 | 700 |
| No. 42 | Comp. Ex. | 89 | 11 | 12.4 | 10.6 | 0.93 | 20.9 | 990 | 0.2 | 700 |
| No. 43 | Comp. Ex. | 86 | 14 | 16.3 | 10.0 | 0.94 | 20.4 | 900 | 0.2 | 700 |
| No. 44 | Comp. Ex. | 58 | 42 | 72.4 | 10.1 | 1.10 | 20.0 | 850 | 0.0 | 650 |
| No. 45 | Comp. Ex. | 52 | 48 | 92.3 | 10.1 | 1.23 | 18.8 | 840 | 0.0 | 650 |

As apparent from Tables 3 and 4, it was confirmed that each of the soft magnetic powders obtained in the respective Examples had a high magnetic permeability.

Further, in the case of each of the soft magnetic powders obtained in the respective Examples, the volume resistivity of the green compact without using an insulating material was 1 kΩ·cm or more, which was sufficient for decreasing the eddy current between particles. Further, the powder magnetic core obtained by compacting the powder using a binding material had a sufficiently high electrical breakdown voltage in the case of each of the soft magnetic powders obtained in the respective Examples. From these results, it was confirmed that it is also possible to further reduce the proportion of the binding material in the powder magnetic core.

On the other hand, it was confirmed that in the case of each of the soft magnetic powders obtained in the respective Comparative Examples, the magnetic permeability was relatively low, the volume resistivity of the green compact without using an insulating material was low, and accompanying this, the electrical breakdown voltage of the powder magnetic core was low.

From these results, it was revealed that according to the invention, a soft magnetic powder which has a high magnetic permeability and can ensure high insulating properties between particles when the powder is compacted is obtained.

What is claimed is:

1. A soft magnetic powder, comprising:

a composition consisting of $Fe_{100-a-b-c-d-e-f-g-h}CU_a Si_b B_c M_d M'_e X_f Al_g T_{ih}$, wherein M is at least one element selected from the group consisting of Nb, W, Ta, Zr, Hf, and Mo, M' is at least one element selected from the group consisting of V, Cr, Mn, a platinum group element, Sc, Y, Au, Zn, Sn, and Re, X is at least one element selected from the group consisting of Sb, In, Be, and As, and where a, b, c, d, e, f, g, and h represent an atomic percentage $0.1 \le a \le 3$, $5 < b \le 20$, $3 < c \le 20$, $5 \le b+c \le 30$, $0.1 \le d \le 30$, $0 \le e \le 10$, $0.1 \le f \le 5$, $0.002 \le g \le 0.032$, and $0.002 \le h \le 0.038$, and a crystalline structure contained in an amount of 40 vol % or more, the crystalline structure having a particle diameter of 1 nm to 30 nm, wherein a volume resistivity of a green compact in a compacted state at a pressure of 10 MPa is 1 KΩ·cm or more and 500 Ω·cm or less, whereon the soft magnetic powder is an atomized powder having an average particle size of 1 μm or more and 40 μm or less, and wherein a Vickers hardness of particles of the soft magnetic powder is 1000 or more and 3000 or less, as measured in a central portion of a cross-section of each of the particles.

2. The soft magnetic powder according to claim 1, wherein the soft magnetic powder further contains an amorphous structure.

3. The soft magnetic powder according to claim 1, wherein M' is Re.

4. A powder magnetic core, comprising:

the soft magnetic powder according to claim 1.

5. A powder magnetic core, comprising:

the soft magnetic powder according to claim 1; and a binding material binding particles of the soft magnetic powder together.

6. A powder magnetic core, comprising:

the soft magnetic powder according to claim 2; and a binding material binding particles of the soft magnetic powder together.

7. A magnetic element, comprising:

the powder magnetic core according to claim 5; and a conductor operatively associated with the powder magnetic core.

8. A magnetic element, comprising:

the powder magnetic core according to claim 6; and a conductor operatively associated with the powder magnetic core.

9. An electronic device, comprising:

the magnetic element according to claim 7; and a body supporting the powder magnetic core.

10. An electronic device, comprising:

the magnetic element according to claim 8; and a body supporting the powder magnetic core.

* * * * *